March 24, 1959 W. S. MACDONALD ET AL 2,879,000

DIGITAL INVENTORY REGISTER

Filed Nov. 18, 1952 20 Sheets-Sheet 1

INVENTOR.
Waldron S. Macdonald
BY Matthew C. Abbott
Kenway, Jenney, Witter & Hildreth
Attys.

DIGITAL INVENTORY REGISTER

Filed Nov. 18, 1952 20 Sheets-Sheet 2

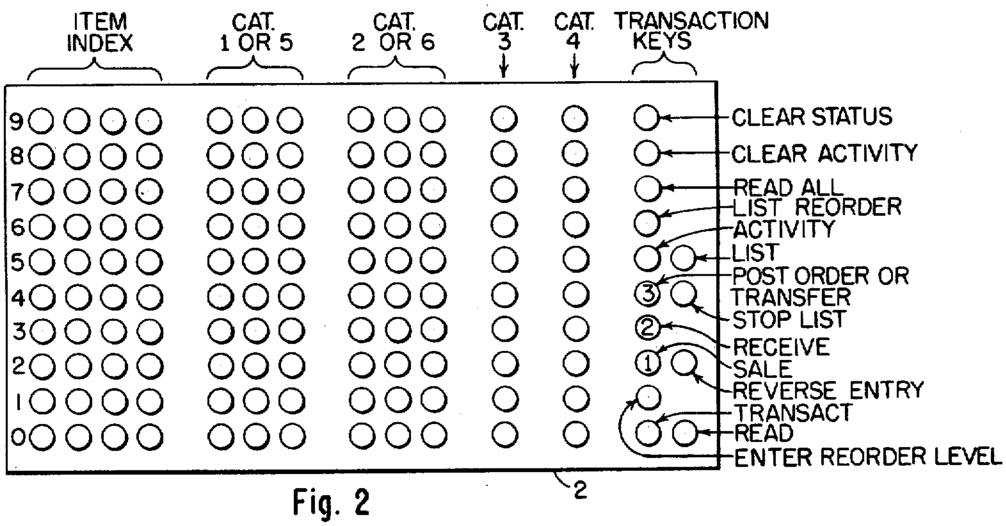

Fig. 2

| | NO. OF CATEGORY | CATEGORY |
|---|---|---|
| "STATUS" CATEGORIES | 1 | ON ORDER |
| | 2 | WAREHOUSE STOCK |
| | 3 | FLOOR STOCK |
| | 4 | REPAIR SHOP |
| "ACTIVITY" CATEGORIES | 5 | PERIOD RECEIPTS OR REORDER LEVEL |
| | 6 | PERIOD SALES |

Fig. 3

| TRANSACTION SYMBOL | TRANSACTION |
|---|---|
| 1 | SALE |
| 2 | RECEIVE |
| 3 | POST ORDER |
| 5 | SALE (REVERSE ENTRY) |
| 6 | RECEIVE (REVERSE ENTRY) |
| 7 | POST ORDER (REVERSE ENTRY) |
| OTHER ENTRIES ARE NOT IDENTIFIED BY SYMBOL | |

Fig. 3a

INVENTOR.
Waldron S. Macdonald
BY Matthew C. Abbott

Kenway, Jenney, Witter & Hildreth
Attys.

INVENTOR.
Waldron S. Macdonald
BY Matthew C. Abbott
Kenway, Jenney, Witter & Hildreth
Attys.

INVENTOR.
Waldron S. Macdonald
BY Matthew C. Abbott

Kenway, Jenney, Witter & Hildreth
Attys.

March 24, 1959 W. S. MACDONALD ET AL 2,879,000

DIGITAL INVENTORY REGISTER

Filed Nov. 18, 1952 20 Sheets-Sheet 5

March 24, 1959 W. S. MACDONALD ET AL 2,879,000

DIGITAL INVENTORY REGISTER

Filed Nov. 18, 1952 20 Sheets-Sheet 6

INVENTOR.
Waldron S. Macdonald
BY Matthew C. Abbott
Kenway, Jenney, Witter & Hildreth
Attys.

INVENTOR.
Waldron S. Macdonald
BY Matthew C. Abbott
Kenway, Jenney, Witter & Hildreth
Attys.

INVENTOR.
Waldron S. Macdonald
BY Matthew C. Abbott

Kenway, Jenney, Witter & Hildreth
Attys.

INVENTOR.
Waldron S. Macdonald
BY Matthew C. Abbott
Kenway, Jenney, Witter & Hildreth
Attys.

INVENTOR.
Waldron S. Macdonald
BY Matthew C. Abbott
Kenway, Jenney, Witter & Hildreth
Attys.

DIGITAL INVENTORY REGISTER

Filed Nov. 18, 1952 20 Sheets-Sheet 11

INVENTOR.
Waldron S. Macdonald
BY Matthew C. Abbott
Kenway, Jenney, Witter & Hildreth
Attys.

March 24, 1959 W. S. MACDONALD ET AL 2,879,000

DIGITAL INVENTORY REGISTER

Filed Nov. 18, 1952 20 Sheets-Sheet 12

INVENTOR.
Waldron S. Macdonald
BY Matthew C. Abbott

Kenway, Jenney, Witter & Hildreth
Attys.

INVENTOR.
Waldron S. Macdonald
BY Matthew C. Abbott
Kenway, Jenney, Witter & Hildreth
Attys.

March 24, 1959 W. S. MACDONALD ET AL 2,879,000

DIGITAL INVENTORY REGISTER

Filed Nov. 18, 1952

20 Sheets-Sheet 14

INVENTOR.

Waldron S. Macdonald

BY Matthew C. Abbott

Kenway, Jenney, Witter & Hildreth

Attys.

INVENTOR.
Waldron S. Macdonald
BY Matthew E. Abbott

Kenway, Jenney, Witter & Hildreth
Attys.

March 24, 1959 W. S. MACDONALD ET AL 2,879,000

DIGITAL INVENTORY REGISTER

Filed Nov. 18, 1952 20 Sheets-Sheet 16

INVENTOR.
Waldron S. Macdonald
BY Matthew C. Abbott

Kenway, Jenney, Witter & Hildreth
Attys.

March 24, 1959 W. S. MACDONALD ET AL 2,879,000

DIGITAL INVENTORY REGISTER

Filed Nov. 18, 1952 20 Sheets-Sheet 17

INVENTOR.
Waldron S. Macdonald
BY Matthew C. Abbott

Kenway, Jenney, Witter & Hildreth
Attys.

March 24, 1959 W. S. MACDONALD ET AL 2,879,000

DIGITAL INVENTORY REGISTER

Filed Nov. 18, 1952 20 Sheets-Sheet 18

INVENTOR.

Waldron S. Macdonald

BY Matthew C. Abbott

Kenway, Jenney, Witter & Hildreth

Attys.

March 24, 1959 W. S. MACDONALD ET AL 2,879,000

DIGITAL INVENTORY REGISTER

Filed Nov. 18, 1952 20 Sheets-Sheet 19

INVENTOR.
Waldron S. Macdonald
BY Matthew C. Abbott

Kenway, Jenney, Witter & Hildreth
Attys.

March 24, 1959 W. S. MACDONALD ET AL 2,879,000

DIGITAL INVENTORY REGISTER

Filed Nov. 18, 1952

20 Sheets-Sheet 20

INVENTOR.
Waldron S. Macdonald
BY Matthew C. Abbott

Kenway, Jenney, Witter & Hildreth
Attys.

United States Patent Office 2,879,000
Patented Mar. 24, 1959

2,879,000

DIGITAL INVENTORY REGISTER

Waldron S. Macdonald, Concord, and Matthew C. Abbott, Greenwood, Mass., assignors to Electronics Corporation of America, Cambridge, Mass., a corporation of Massachusetts Application November 18, 1952, Serial No. 321,112

17 Claims. (Cl. 235—153)

This invention relates to digital information storage registers and more particularly to registers adapted for storage and automatic analysis of the type of information necessary, for example, for keeping track of inventories in large department stores or for other analogous uses where the values or amounts of numerous items are constantly changing. This application is a continuation-in-part of our now abandoned application Serial No. 240,692, filed August 7, 1951.

Keeping track of inventories in department stores is a vital factor in maintaining efficient operation. Its importance is felt in many aspects of the business. For instance, the broad and general knowledge of buying trends, which is vital to long-range store planning, comes to the store management through the study of past changes in inventory. Another place where inventory knowledge is vital, relates to replacement purchasing. In order to build up a reputation for service, a store should monitor inventories assiduously to maintain sufficient stock on hand to satisfy consumer demands. Also, of course, inventories should be analyzed to prevent unnecessary or undesirable purchasing which result in frequent and unprofitable clearance sales. Another field, where inventory knowledge is highly important, relates to planning for tax purposes. For instance, it may be highly advantageous to pare the inventory down to a minimum at the close of a tax period, but, without accurate information immediately available, a store cannot risk doing so. Accurate and readily available inventory information also has the direct advantage of reducing the necessity for stockpiling or, collaterally, of enabling the store to carry a larger variety of items with the same amount of working capital. Another advantage of high speed, accurate inventory knowledge relates to store losses. If information is readily available as to the number of items which should be, for instance, on the sales floor after a given number of sales, then immediate spot checks can be made and the cause of losses from the floor can be more easily discovered.

Although the business world generally recognizes the advantages of speed and accuracy in analyzing inventory changes, very little improvement has been made in this field in recent years. A number of attempts have been made to reach a solution for the problem, but in general these attempts have either amounted merely to a substitution of one manual operation for another, or have comprised complex equipment of relatively enormous size which has proved cumbersome, unreliable or difficult to maintain. The result is that, by and large, inventory information has been so hard or so expensive to obtain by presently employed methods that the generally accepted practice in business today is to base decisions almost exclusively upon general business experience, such as item purchasing lists and curves established by inventory analysis of previous years, rather than relying upon up-to-date, accurate inventory information coupled with business judgment.

One of the reasons why inventory knowledge is so difficult and expensive to obtain is that, to be effective, it requires a large number of entries in various sets of books. For instance, when a store receives a shipment of items from the manufacturer, the items received may be allocated in a number of different ways. Some of them may be retained in the warehouse, others may be placed on the sales floor, while still others may be returned to the manufacturer as defective or placed in the repair shop. Keeping track of the items received then requires entries in many categories, and to make the inventory picture complete, the number of items which were previously kept in the books as being "on order" should be reduced, when items are received, by the number of items so received and not returned. In addition to this an entry should be made in a cumulative record of receipts over a given sales period, if such information is desired. Making all of these entries, additions and subtractions, even with modern card filing systems, requires a large staff, and is so open to human error that it cannot be relied upon.

Therefore, it is an object of this invention to provide a relatively inexpensive machine which can furnish a running account and an analysis of continuously up-to-date inventory information including provision for automatic cross-entries in various different but related categories. Of course, as a collateral to this object is the provision of a relatively inexpensive mechanism for keeping and making readily available data on a large number of constantly changing items in problems analogous to the department store inventory problem, but not necessarily limited thereto.

Additional objects of this invention include the following:

(*a*) The provision of a compact and reasonably portable machine adapted to operate on conventional electrical supply sources and capable of permanently storing information relating to a large number of separate items.

(*b*) The provision of an inventory register capable of storing and returning information rapidly, as well as performing simple computations relative to a large number of separate items.

(*c*) The provision of an inventory register which is so simple in operation as not to require a skilled operator, and which will produce a printed record of all transactions so that a permanent record may be maintained for checking purposes.

FEATURES (*a*) *Ample storage: (15 digits for 10,000 separate items)*

In the accomplishment of this and other objects of our invention, in a preferred embodiment thereof, we employ a rotating magnetic storage drum on the surface of which the inventory information is stored in the form of discretely magnetized areas or cells each representing the presence or absence of a digital unit, depending upon the polarity of magnetization of the cell. Cells polarized in the direction of drum rotation indicate the absence of a unit of a digit while those polarized reversely indicate the presence of such a unit. Information stored in this manner may be kept on the drum permanently or may be changed as desired. In order to enter information on the drum and to read it from the drum, we provide a "reading and writing" head equipped with suitable magnetic elements for detecting or changing the polarity of each cell and together with this reading and writing head, we employ mechanism both for physically placing the head in a multiplicity of positions along the drum and for selecting particular cells around the circumference of the drum once the head has reached a designated position. The drum we employ is about eight inches (8") in diameter, about thirty-eight inches (38") long, and provides approximately a total of 1,350,000 discrete areas or cells each capable of retaining a component of information. Although other unitary systems are, of course, possible, in the preferred embodiment herein described, we employ the decimal system, for simplicity in the context of an inventory register. This requires one to use nine of the said magnetized areas or cells for each complete digit. Thus, with the mechanism of our preferred embodiment, we can store fifteen separate digits for ten thousand separate items of inventory (actually we only use fourteen of these digits in the present context), and thereby we provide ample inventory coverage for the average department in a large department store. The entire apparatus is reasonably portable, being about the size of a conventional office desk, and operates on conventional 110–120 volts A.C.

In the present context, we employ the fourteen digits relating to each item of inventory, to store information in the following categories:

Status categories:
- (1) three digits for "on order,"
- (2) three digits for "stored in the warehouse,"
- (3) one digit for "stored on sales floor,"
- (4) one digit for "repair shop,"

Activity categories:
- (5) three digits for "period receipts," and
- (6) three digits for "period sales."

As above indicated, the categories are arranged in two groups, that is, categories 1 to 4 are in the "status" group while categories 5 and 6 are on the "activity" group. The reasons for distinguishing between these groups will become more apparent as the detailed description progresses.

(*b*) *Operating mechanisms (keyboard, controls, printer)*

The apparatus is controlled, and the information is entered on or read from the drum through the initial operation of a keyboard which operates through various circuits to position the reading and writing head, to select the proper magnetized areas on the drum for reading or writing, to transmit the information to or from the drum, to make cross entries, and finally to record the transaction by means of an electrically operated printing unit.

(*c*) *Automatic cross entry provision*

It is a feature of our invention that when an entry in one category requires a corresponding addition or subtraction in one or more other categories, the mechanism will automatically make such further entries and thereby reduce the opportunity for human error. For instance, if 150 units of an item are received, the "on order" category for that item is automatically reduced by 150 units when the receipt transaction is entered in the machine, and thereafter stock quantities are entered in the appropriate categories and the cumulative total for receipts in the sales period or "period receipts" category is automatically increased by 150 units.

(*d*) *Reorder information provision*

An additional feature of our invention is that it may be adapted to give automatic reorder information such that a rapid running of the machine through the entire list of items can provide the store with a list of all items requiring reorder.

(*e*) *Reverse entry provision*

Another feature of our invention is the provision of means for reversing entries. Thus, if certain items already entered, for instance, as "received" are later returned to the manufacturer, the transaction is entered simply by reversing the "receipt" transaction. This feature is useful also in correcting human errors by providing a simple way for returning the apparatus to its previous condition after an erroneous entry has been made.

(*f*) *Accuracy of clearance between magnetic drum surface, and reading and writing head*

Further features of our invention are best understood in relation to the problems encountered in the type of equipment employed. For instance, one of the initial problems in using a rotating, magnetic storage drum together with a longitudinally movable reading and writing head is one of clearance between the head and the surface of the rotating drum. A minimum clearance is desirable to provide the maximum signal amplitude, and uniformity of clearance within narrow limits is necessary to maintain adequate signal uniformity at such minimum clearance. In our invention, we solve this problem by using a solid aluminum cylinder, by mounting it in thoroughly cleaned, pre-loaded, ball bearings, and by carefully machining the surfaces over which the head travels. In this way, we are able to reduce the gap between the head and the magnetic surface to about .0006" and maintain a variation therein of no greater than .0003".

(*g*) *Longitudinal registration of head on drum*

Another problem relates to longitudinal registration of the head with the drum. We accomplish this by means of a servo mechanism employing a motor which drives the head longitudinally and which is controlled by balancing voltages in a potentiometer circuit including a slide wire resistor in contact with a sliding contact carried by the head, and a special control circuit adapted in relation to item index keys on the keyboard for selection of a voltage corresponding to the desired position of the head relative to the said resistor. In our equipment, we can select any one of 500 longitudinal positions for the head, and bring the head to any one of these positions within a tolerance of about .005". Each track is about .050" wide and there is a dead space of about .020" between circumferential tracks. It is a feature of this arrangement that the mechanism is repetitive in its performance, and therefore it is not necessary to provide any high degree of accuracy in spacing the circumferential tracks one from the other. For instance, one dead space between tracks may be .018" and the next .025" without any detrimental effect as long as the head is placed repeatedly in the same position for each given track. A minimum of .010" between tracks is desirable to avoid magnetic interference from adjacent tracks.

(*h*) *Selection of pulses in each circumferential track*

Another problem relates to selection of individual pulses in each circumferential track. In the preferred embodiment hereinafter described, we provide each circumferential track on the drum with a total of 2700 possible separate areas or cells for storage of units of digital information. These cells are established on the drum and are thereafter distinguished one from the other with reference to a previously established index track at one end of the drum provided with a separate reading and writing head. The index track provides pulses which, through counting circuits, cause the principal reading and writing elements to perform their function at the precise instant when the appropriate cell on the drum passes the reading and writing head. The index track is also employed to provide a pulse at the end of each drum revolution. This pulse is called a "marker" and is used to advance the control unit from one phase of operation to the next. Thus accurate regulation of the rate of rotation of the drum is not necessary and the functions of the machine need not be further synchronized with the drum because they are actuated by the index track carried on the drum itself.

(*i*) *Rate of rotation of drum*

(1) RELATIONSHIP TO CAPACITY OF PRINTER

We regard to the rate of rotation of the drum, however, two relationships must be observed. First, there is the relationship between the rate of rotation of the drum and the rate of operation of the printer. The printer employed in the present embodiment of our apparatus has a limiting capacity of 14 characters per second. Then if a character is to be printed for each revolution, the drum must rotate at a slower rate than 14 c.p.s. In the present embodiment, the drum is rotated at about 10 c.p.s.

(2) RELATIONSHIP TO FREQUENCY LIMITS OF THYRATRON ADDING RING

Still another problem relates to the rate of reception of impulses from the drum. It is at present desirable in this type of equipment to employ thyratron tubes in the electronic adding rings which are used to store the separate digits before printing them. Thyratron tubes employ a low impedance and avoid the necessity for shielded cables and the complicated buffer circuits otherwise necessary for suppression of interference. However, since the thyratron tube counter circuits as herein used have a maximum frequency of about 2 kc. and since the drum rotates at approximately 10 c.p.s., it is impossible to bunch the cells relating to each digit (when there are 2700 cells in each circumferential track) without exceeding the frequency limit of the thyratron tubes. We overcome this by spacing the cells for each digit evenly around the drum by employing counting circuits which instead of selecting nine consecutive cells for a given digit, select nine cells spaced 300 cells apart around the drum. In this way the nine pulses for each digit issue at spaced intervals throughout the drum revolution at a rate of slightly less than 100 c.p.s., well within the frequency limitation of the thyratron tubes.

Further objects and features of our invention will best be understood from a detailed description of a preferred embodiment thereof, selected for purposes of illustration and shown in the accompanying drawings, in which:

Fig. 2 is a plan view of the keyboard employed;

Figure 4A:
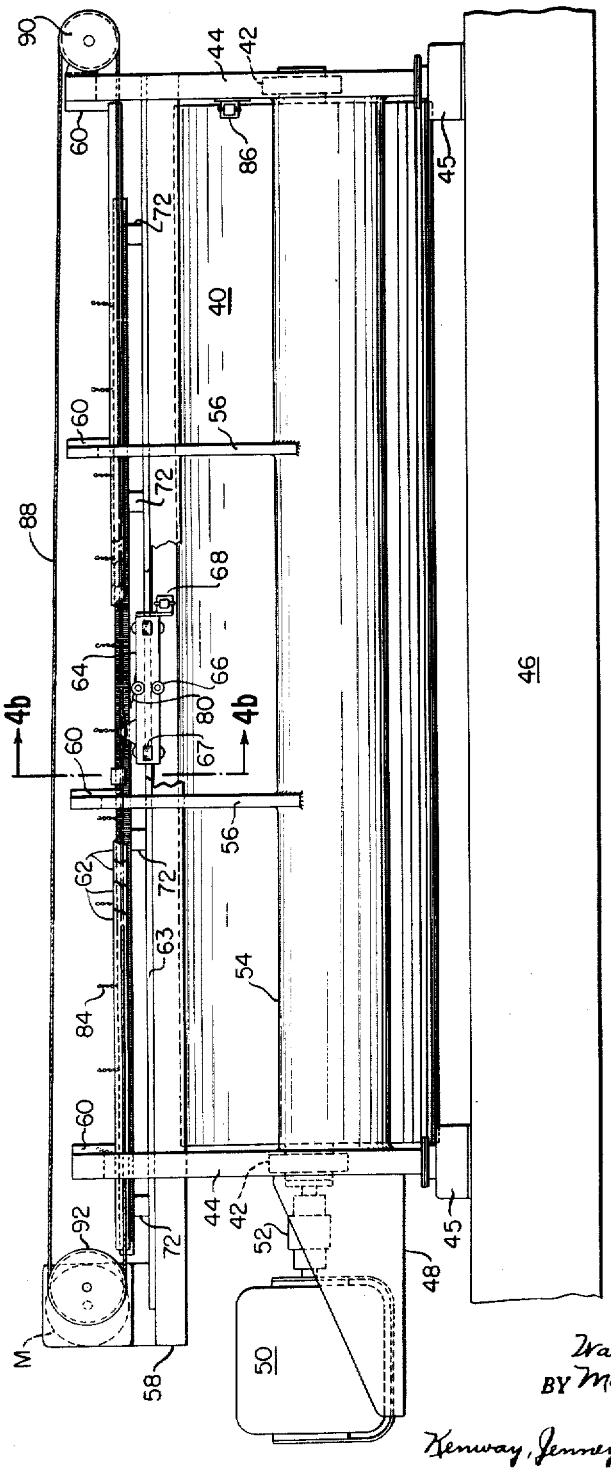
Figure 4B:
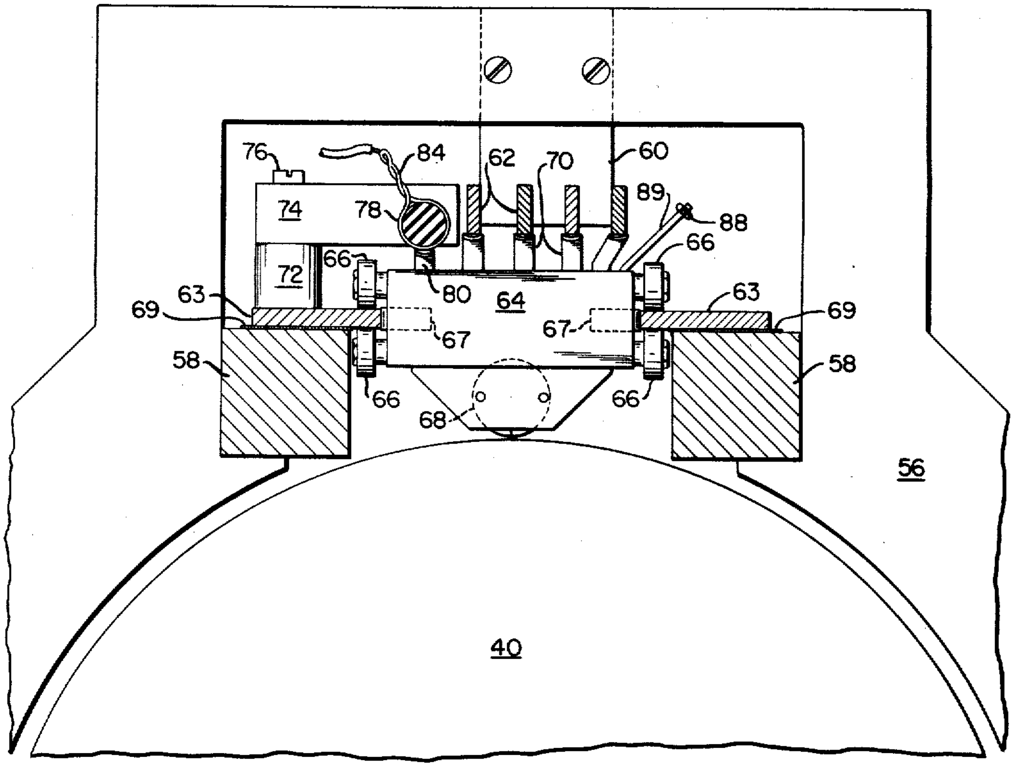
Figure 5:
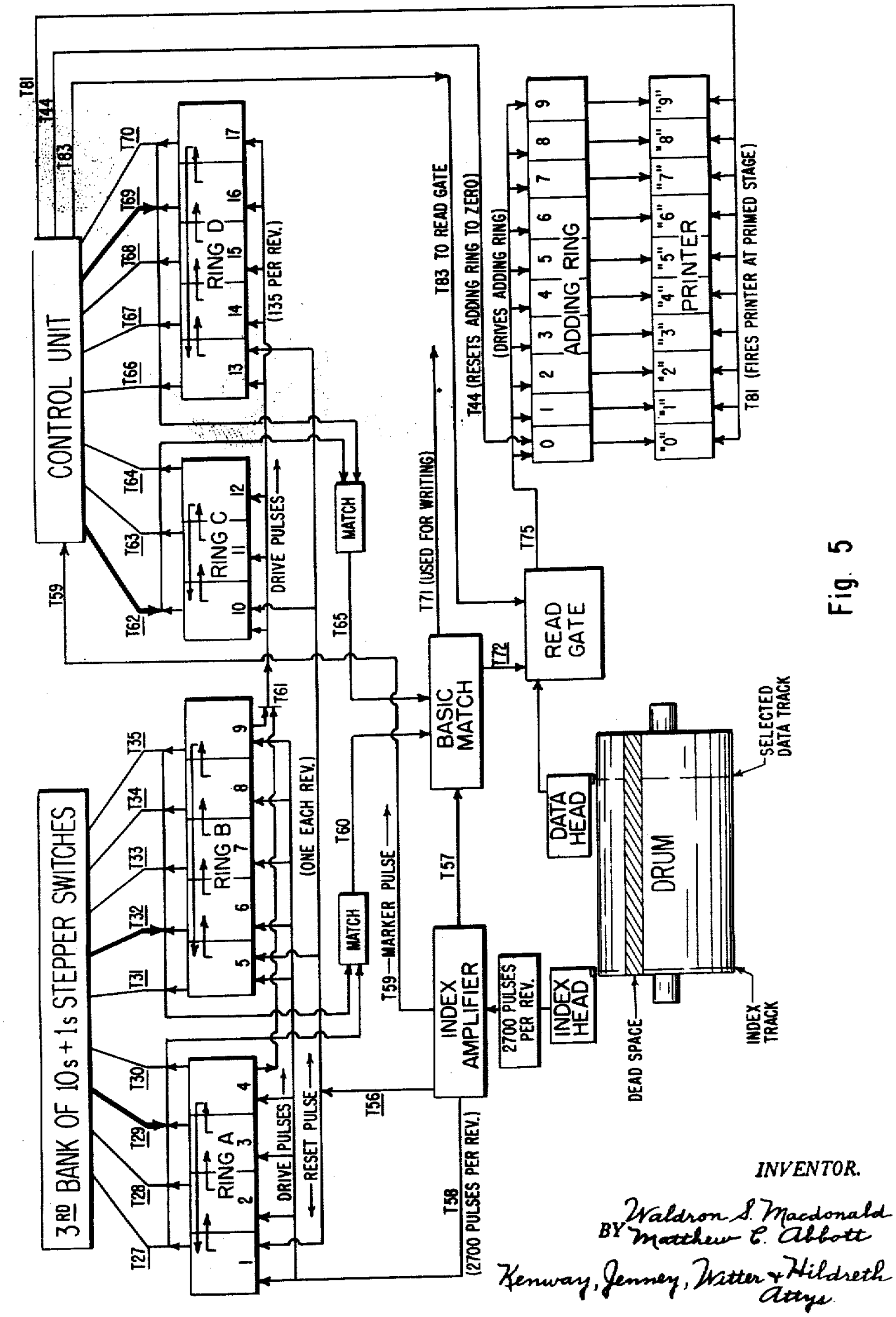
Figure 6:
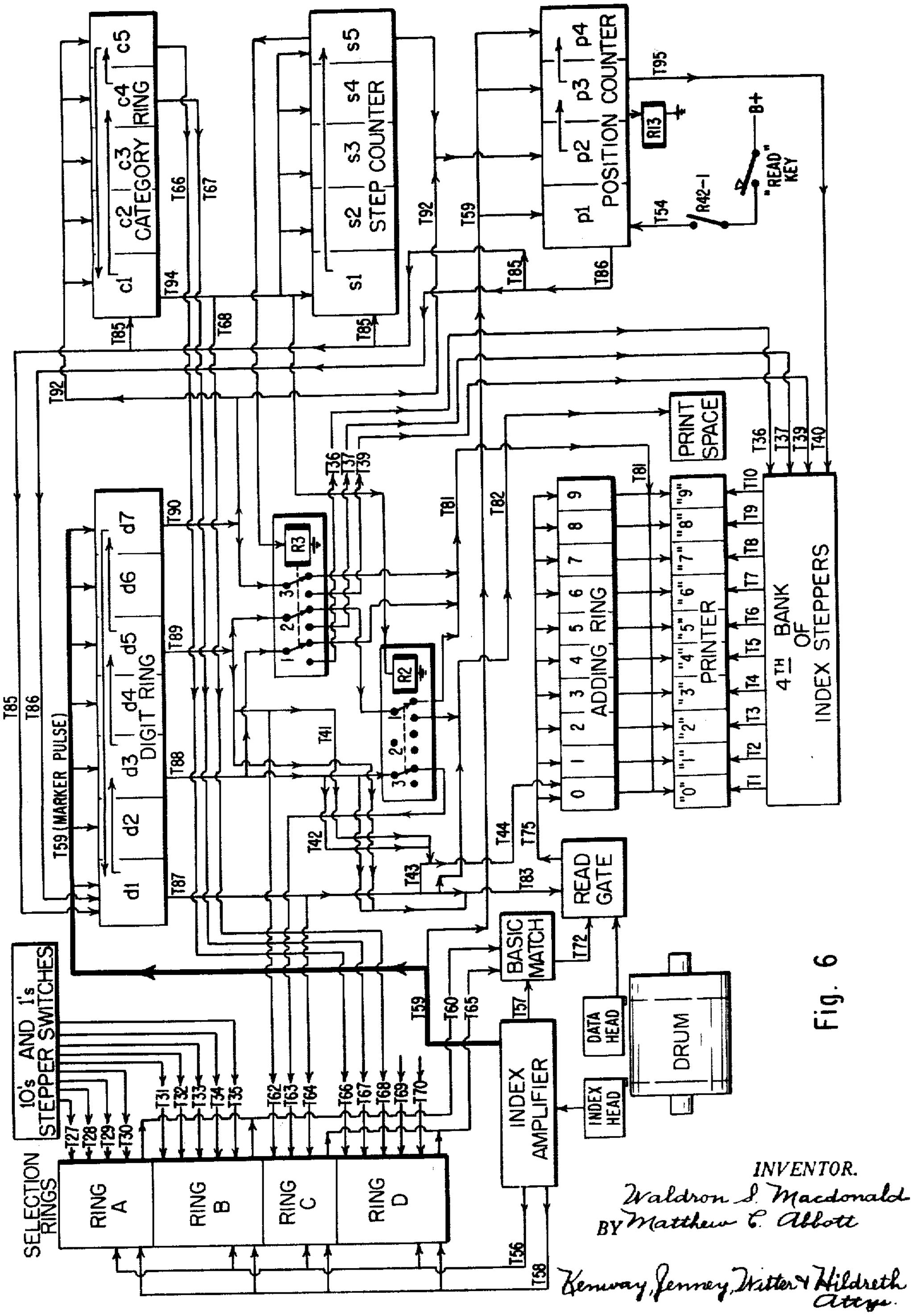
Figure 7:
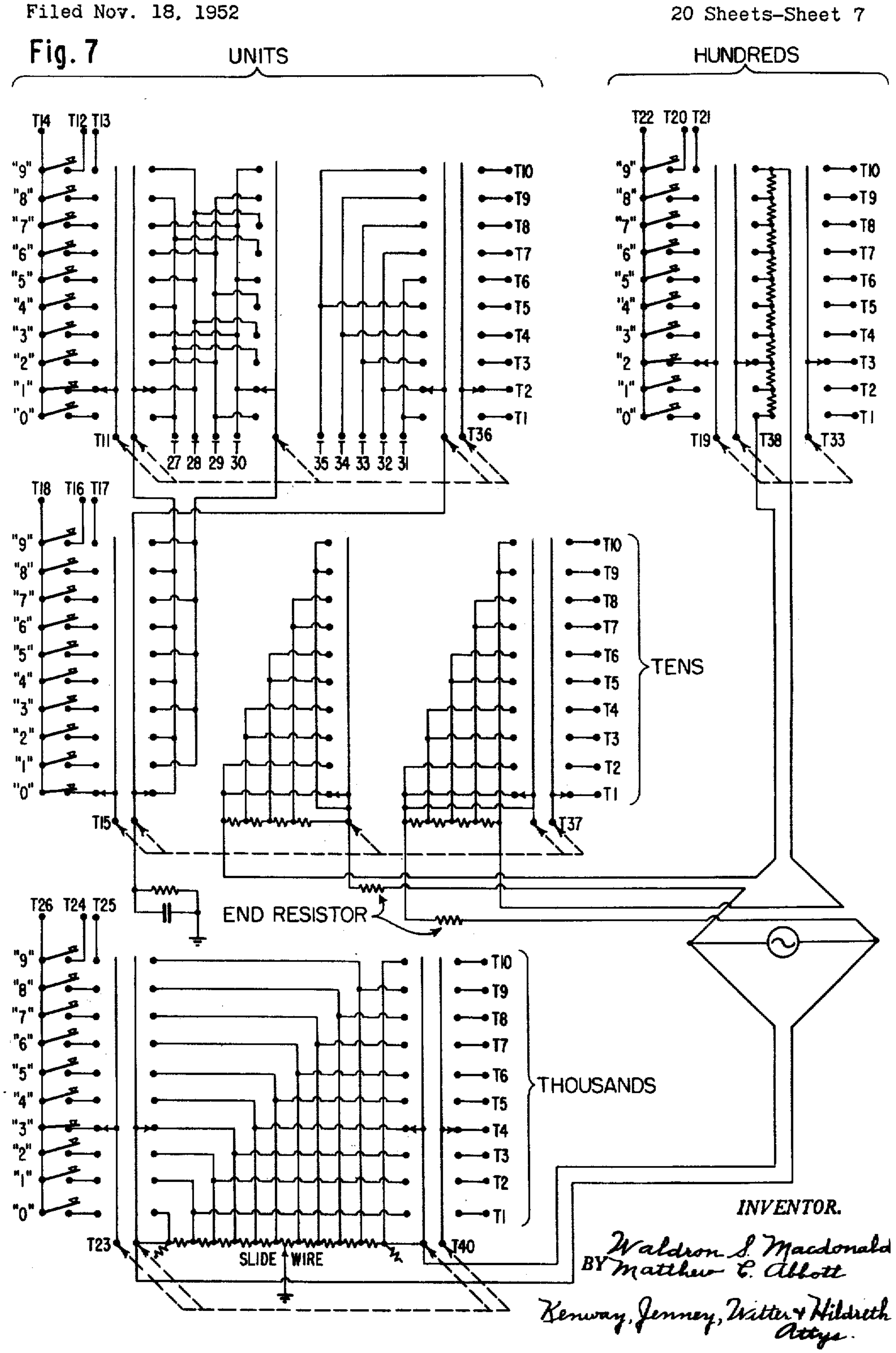
Figure 8:
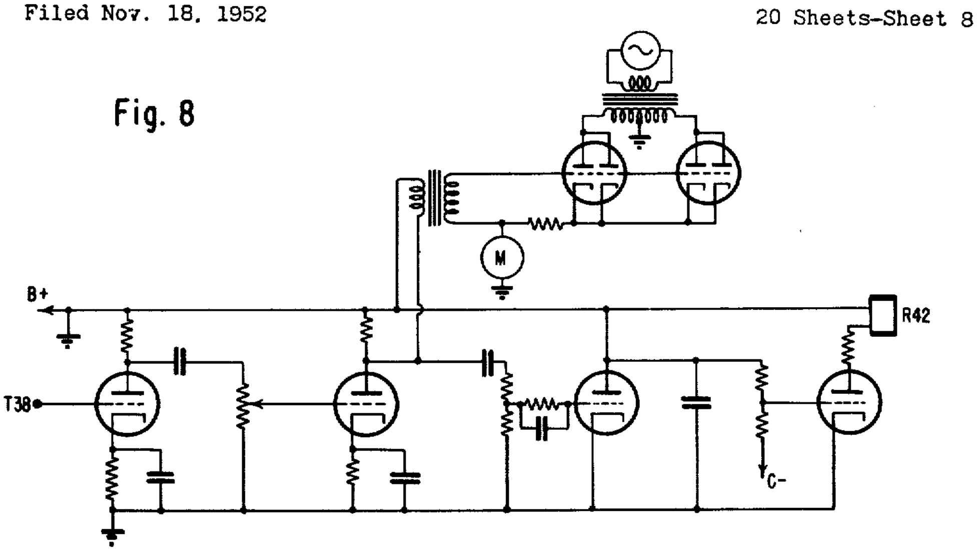
Figure 9:
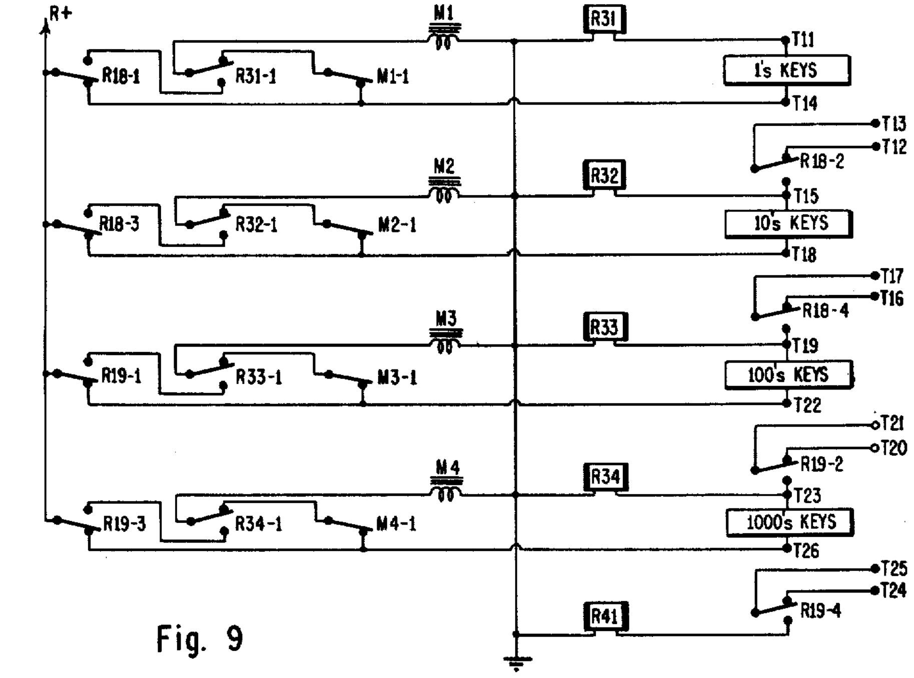
Figure 10:
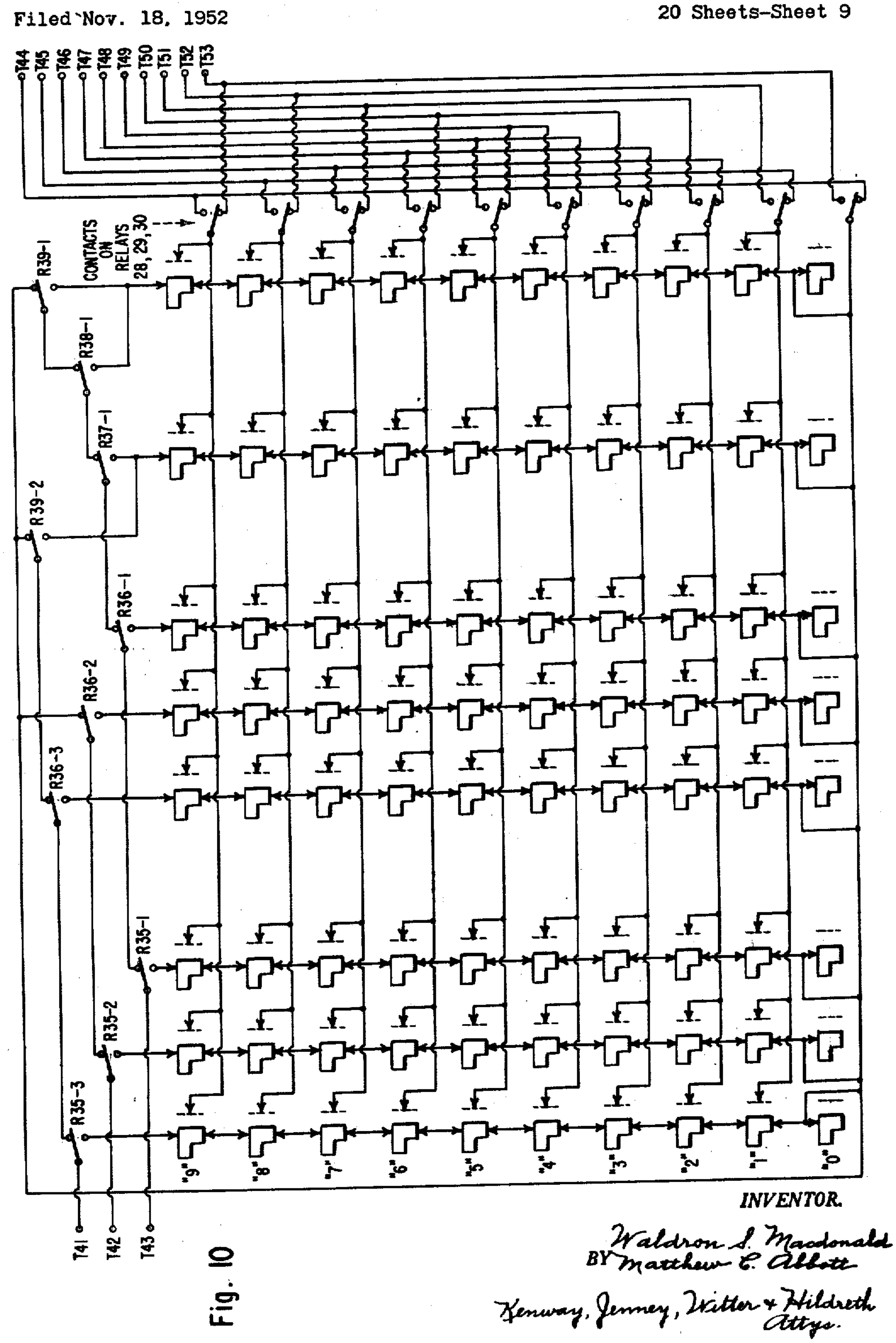
Figure 11A:
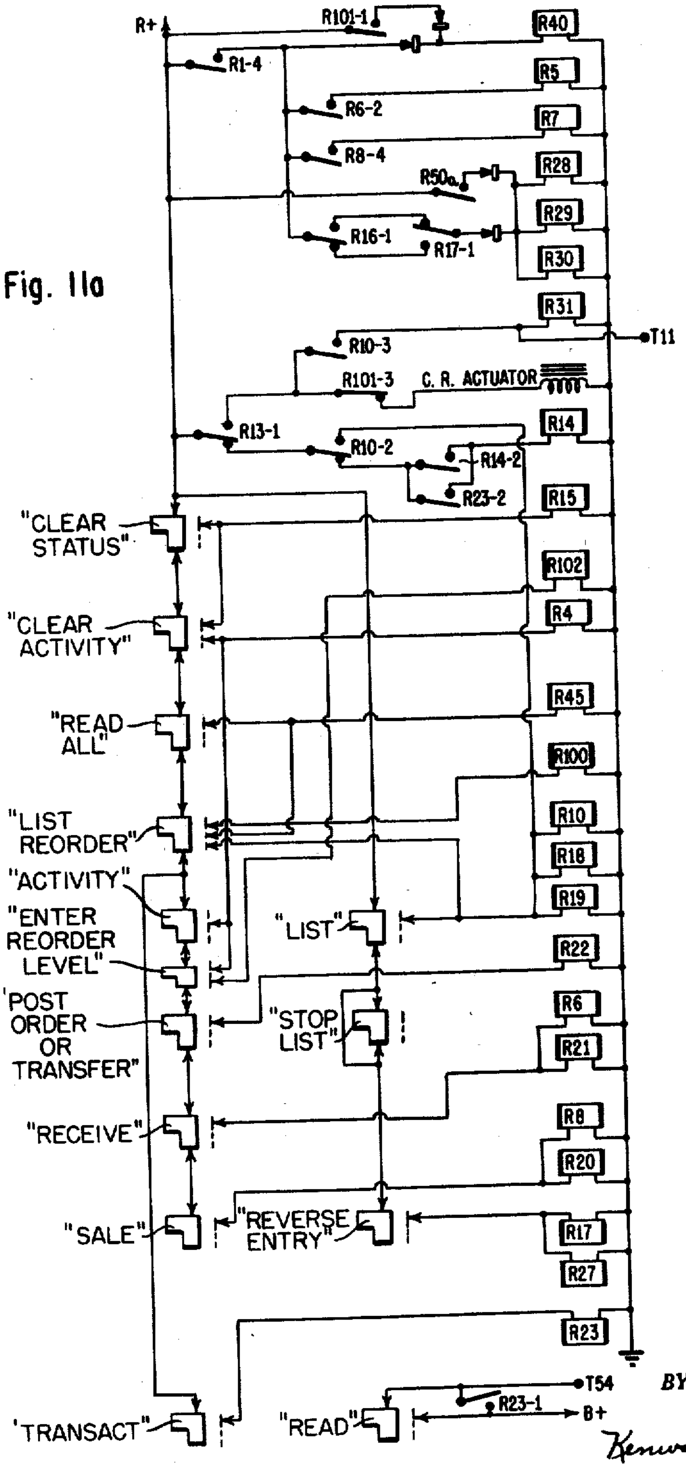
Figure 11B:
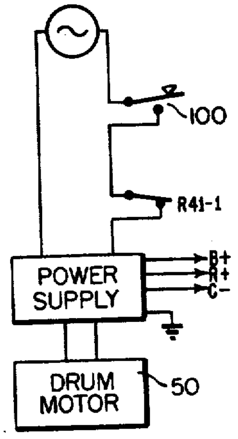
Figure 12:
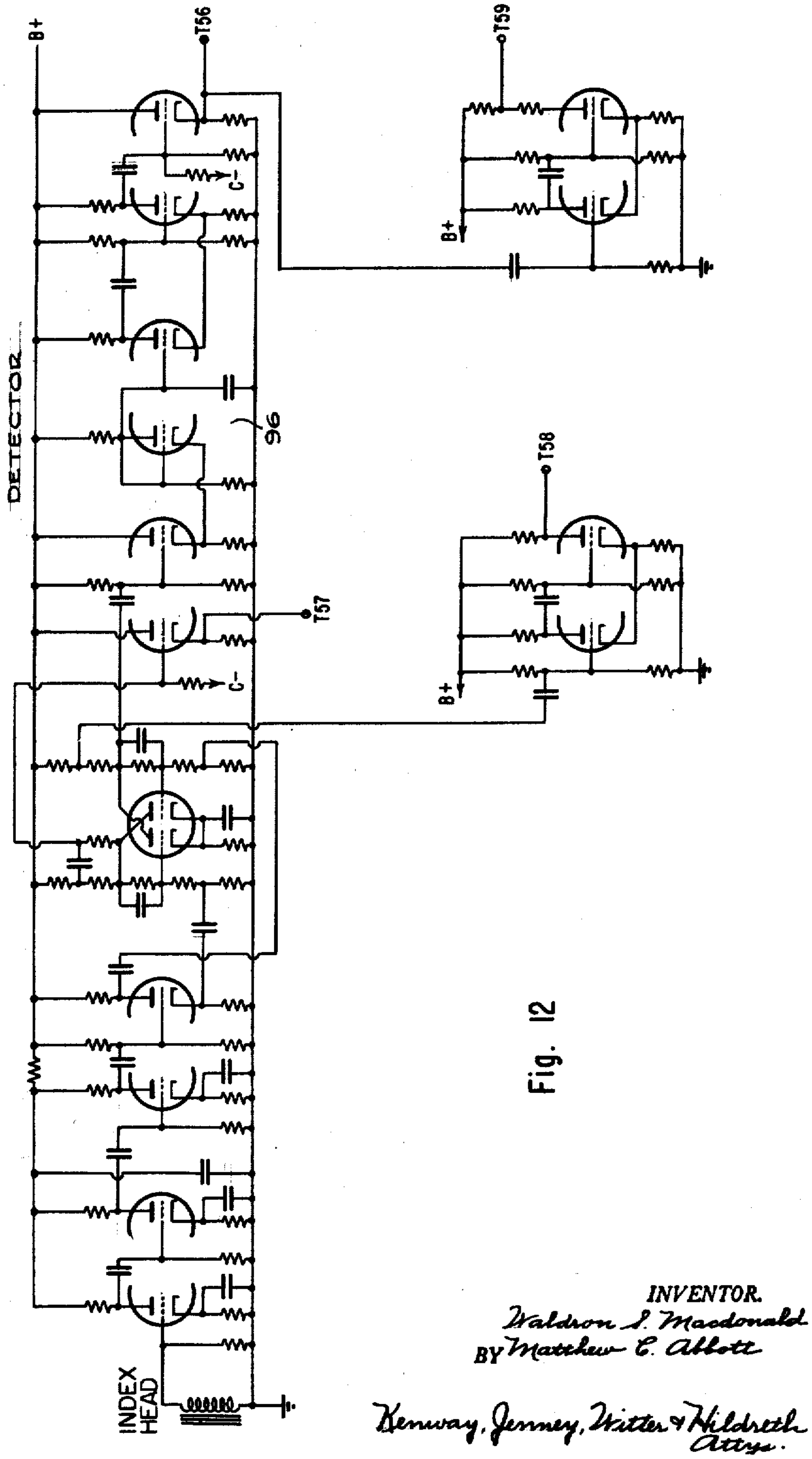
Figure 13:
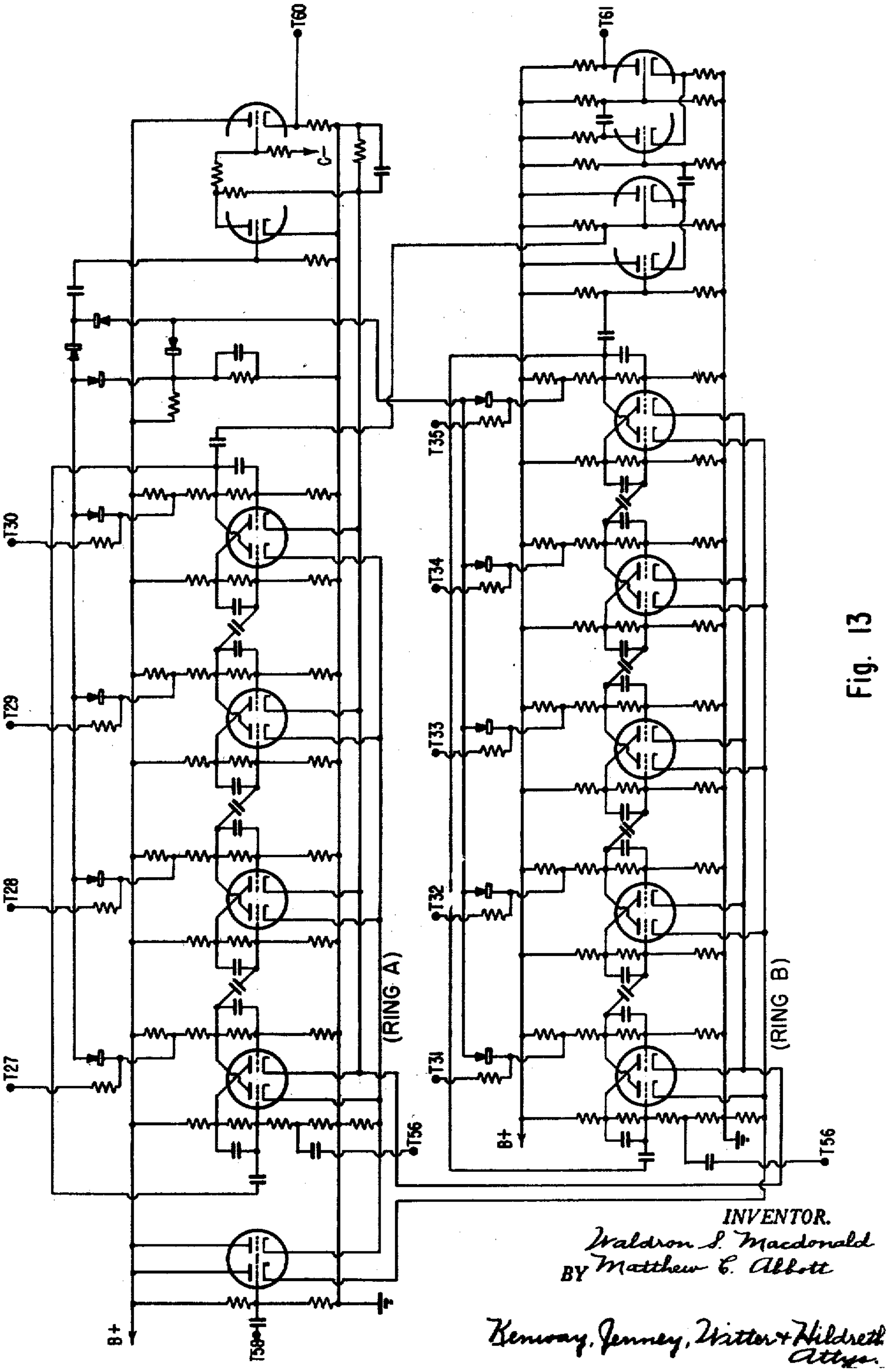
Figure 14:
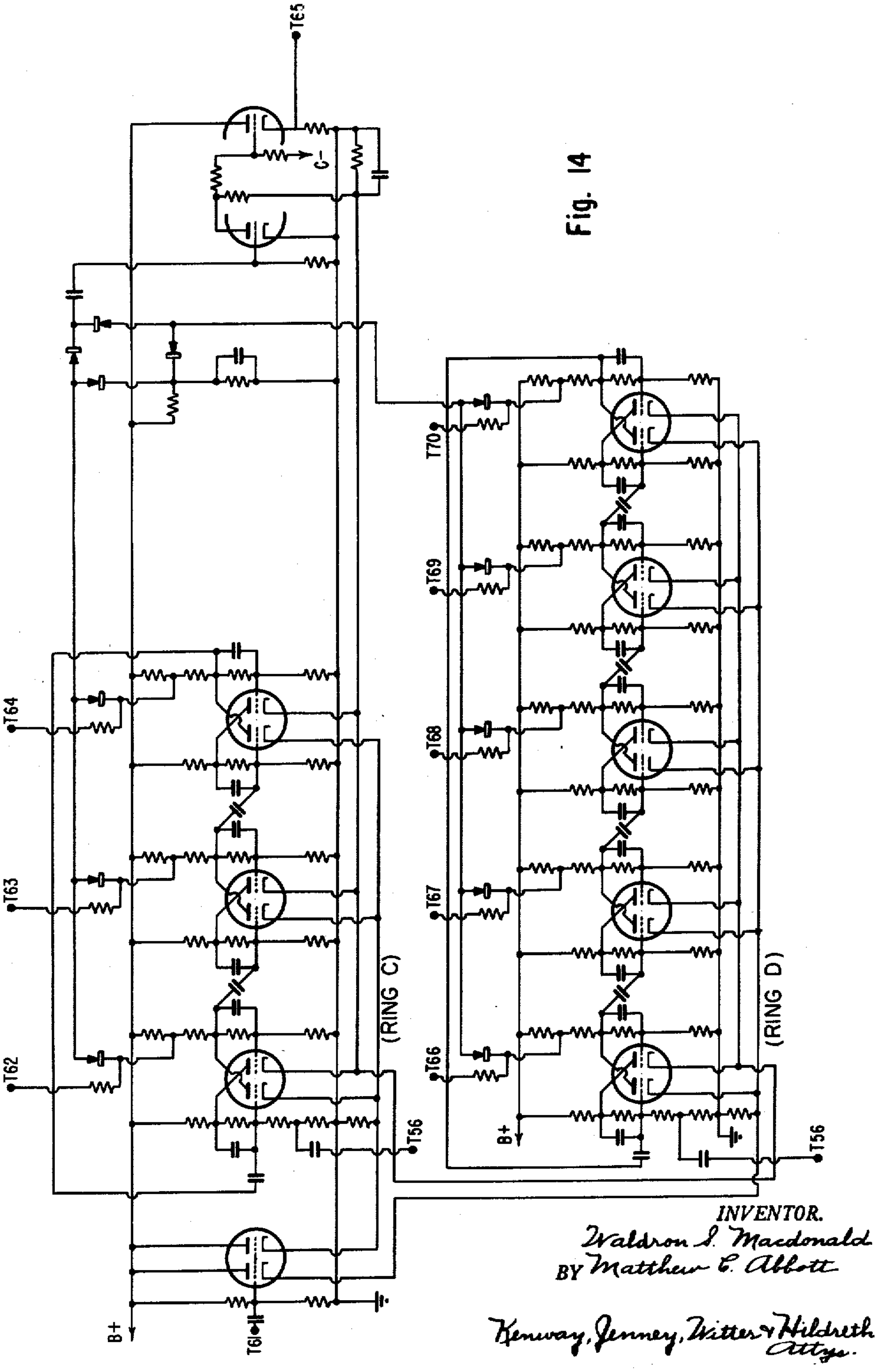
Figure 15:
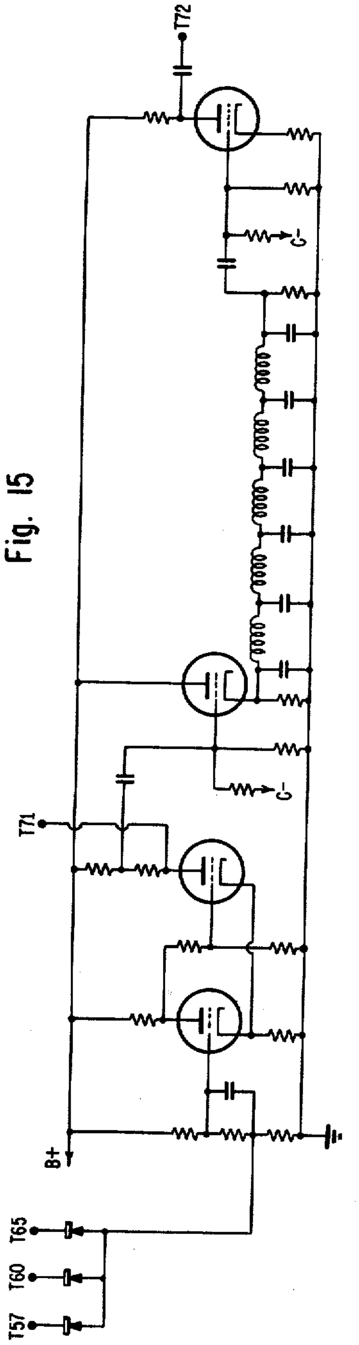
Figure 16:
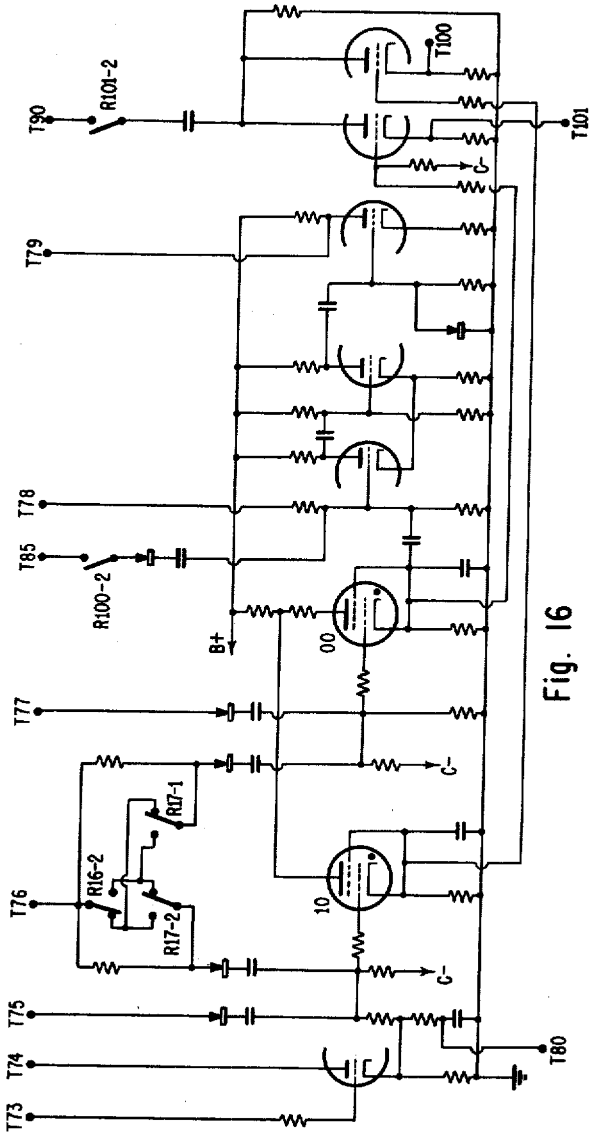
Figure 17:
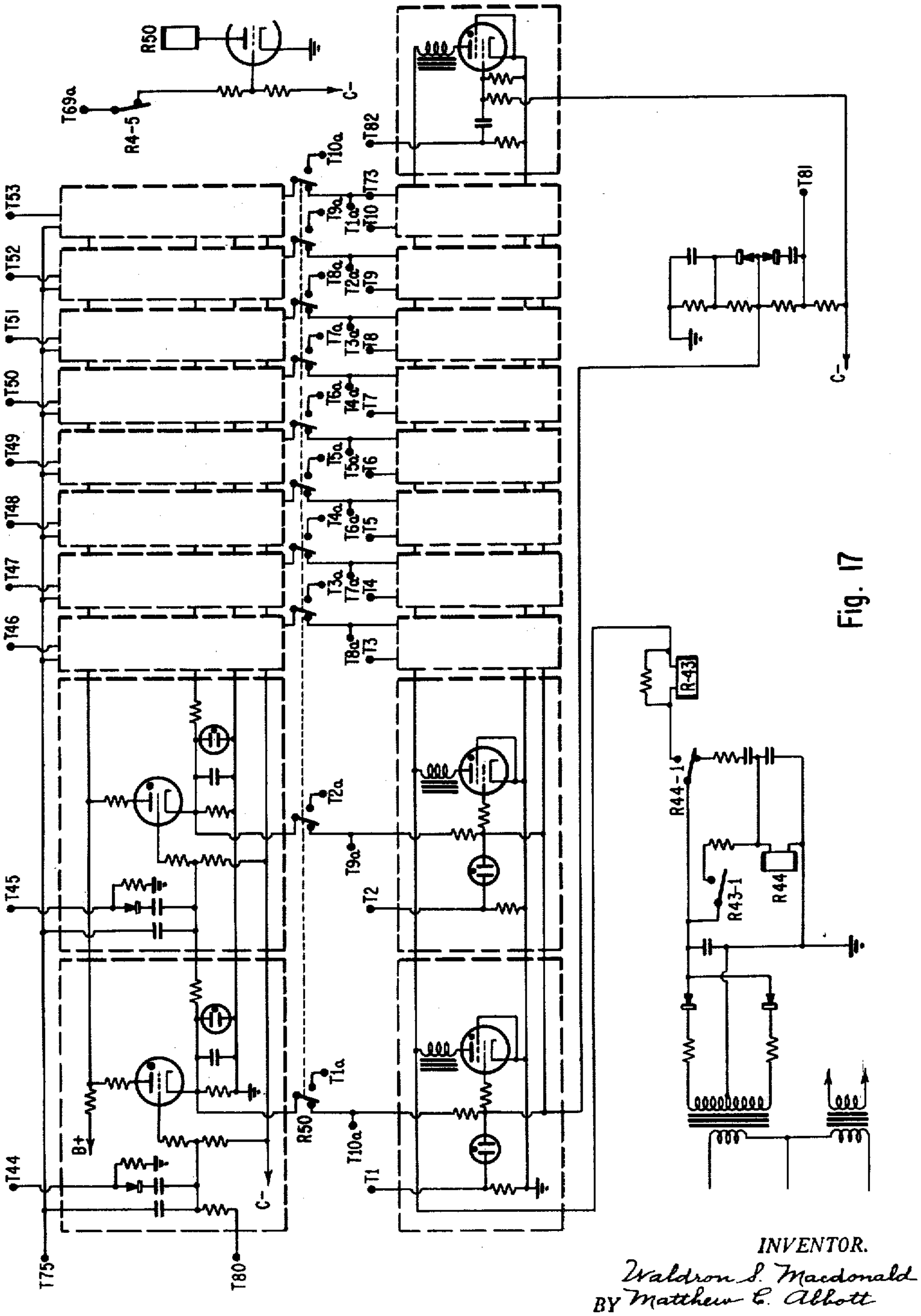
Figure 18:
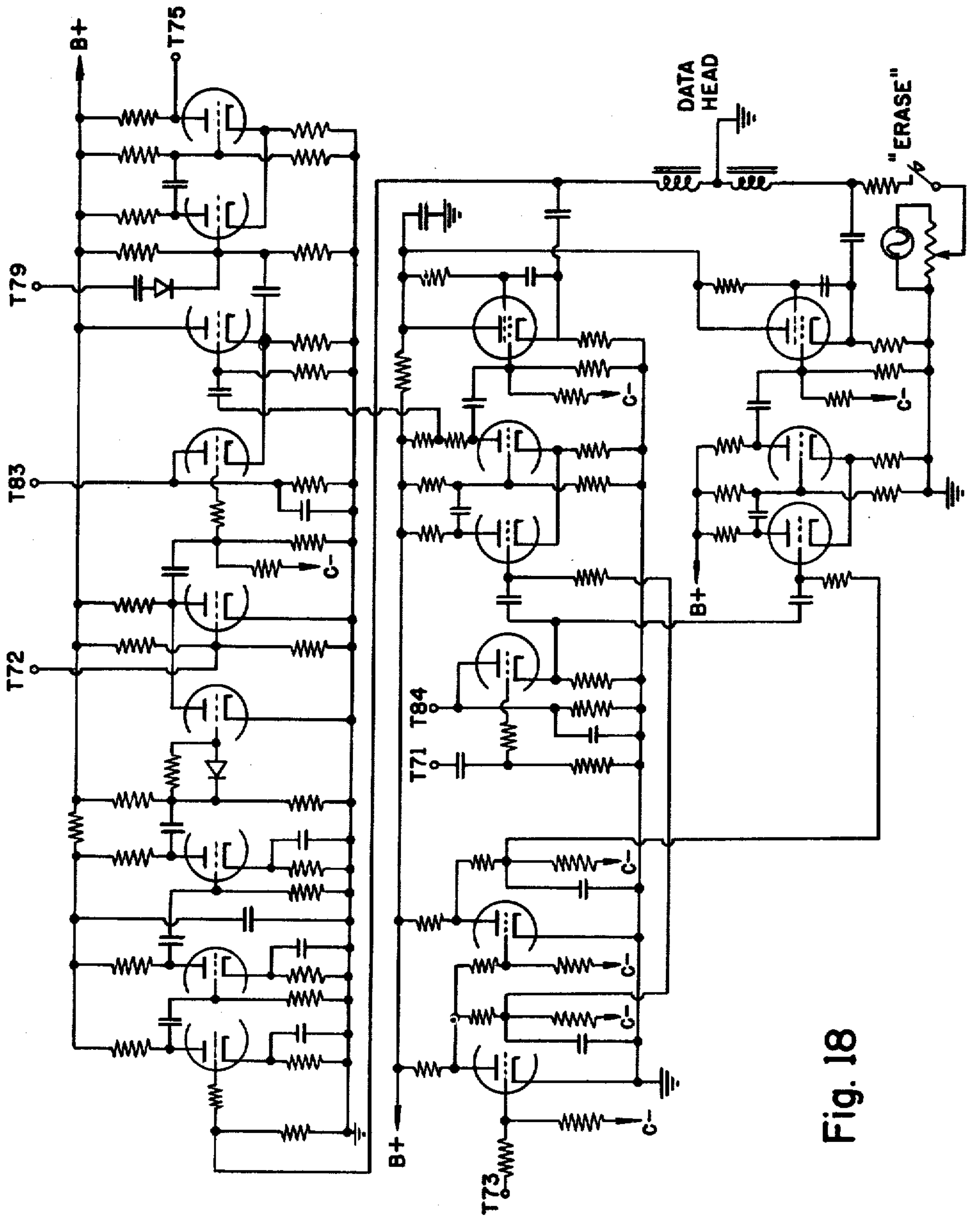
Figure 19:
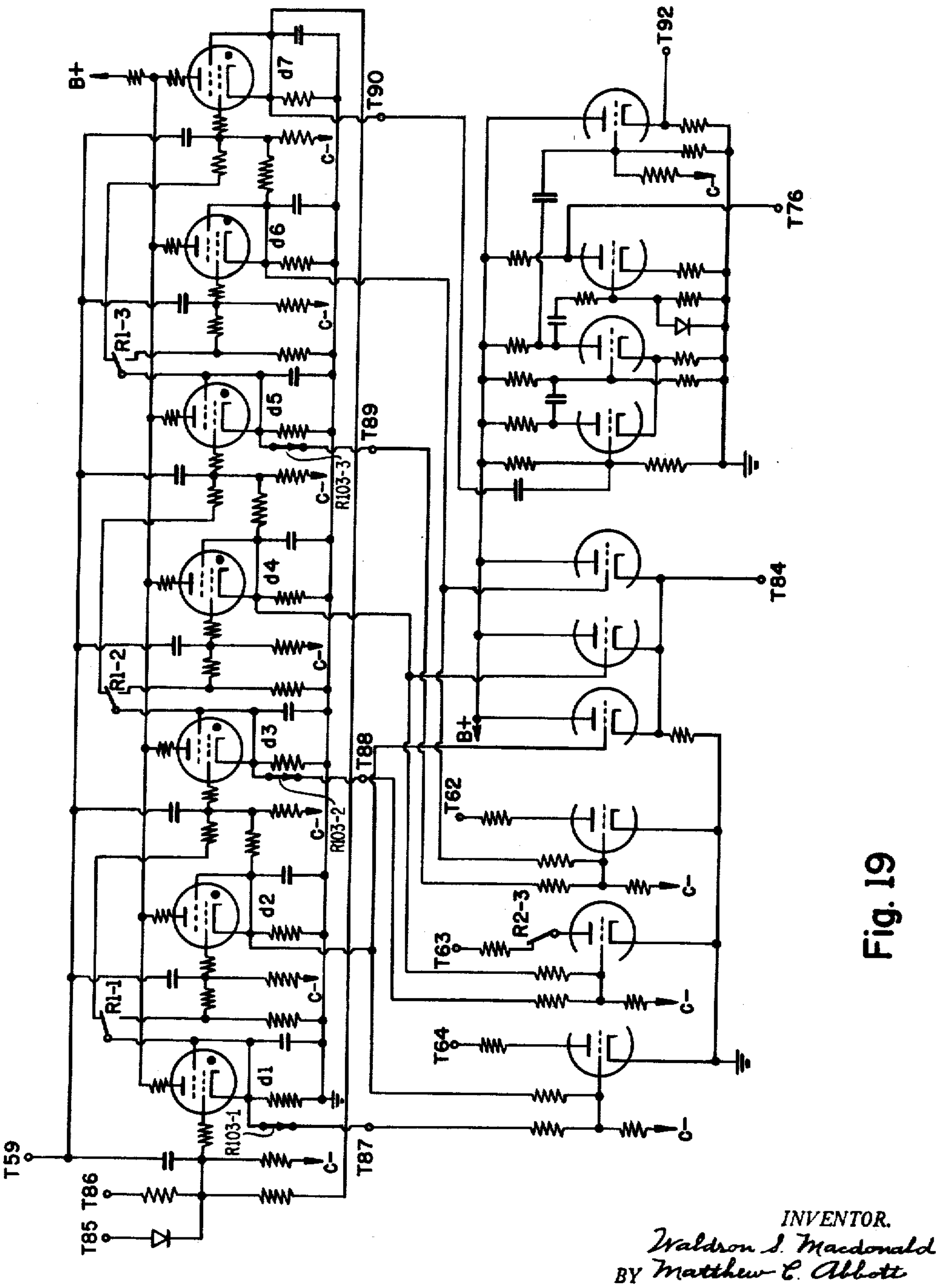
Figure 20:
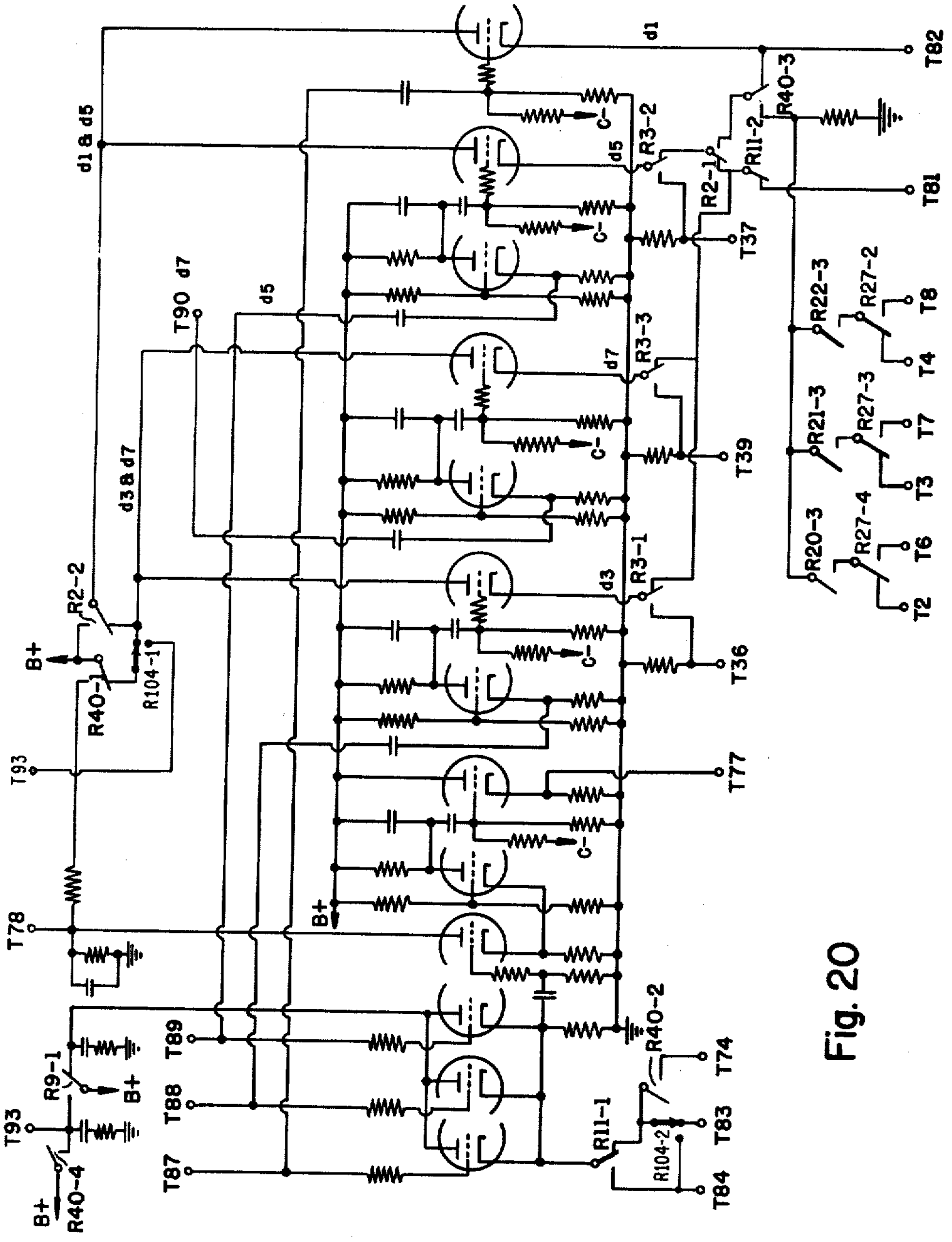
Figure 21:
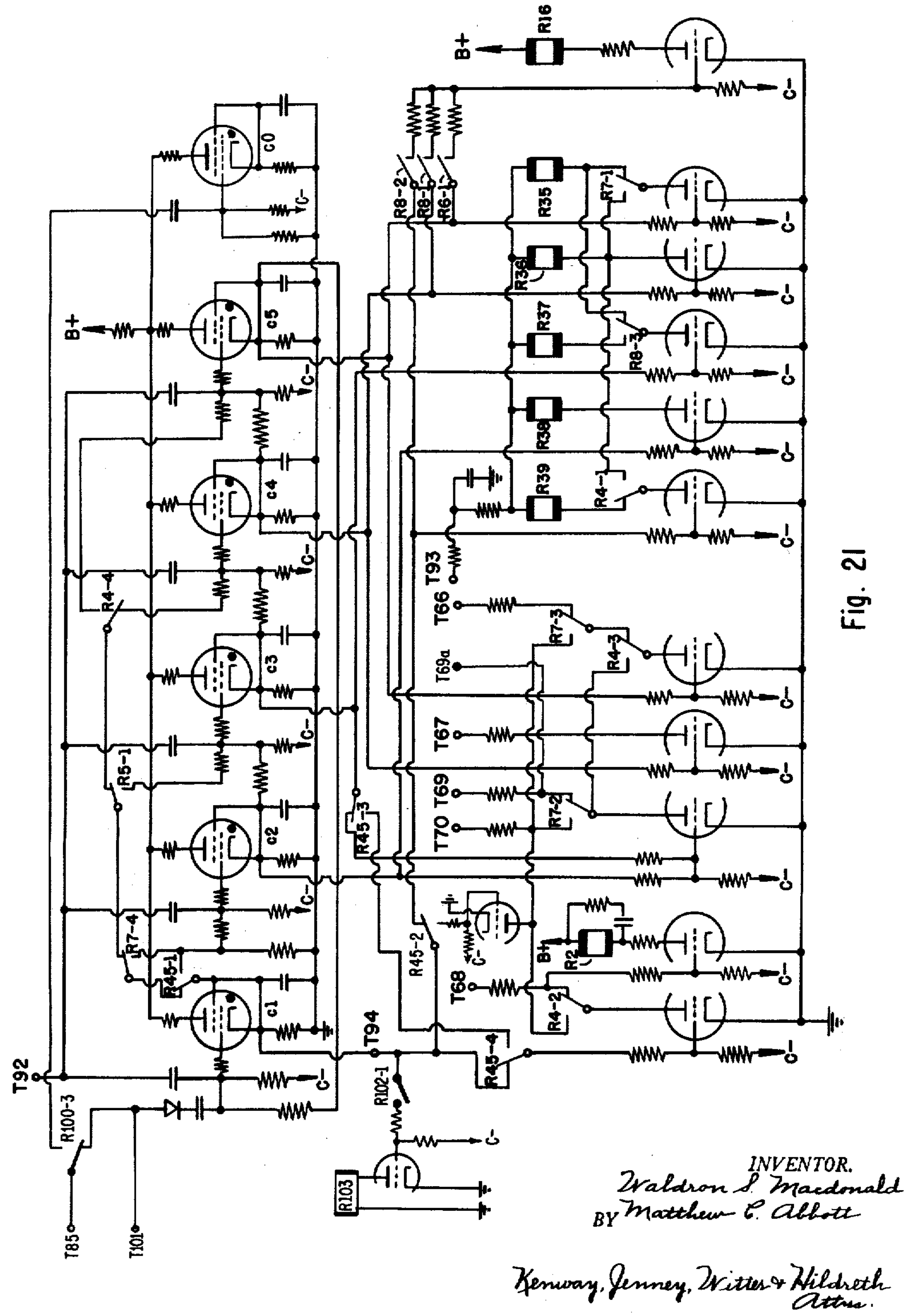
Figure 22:
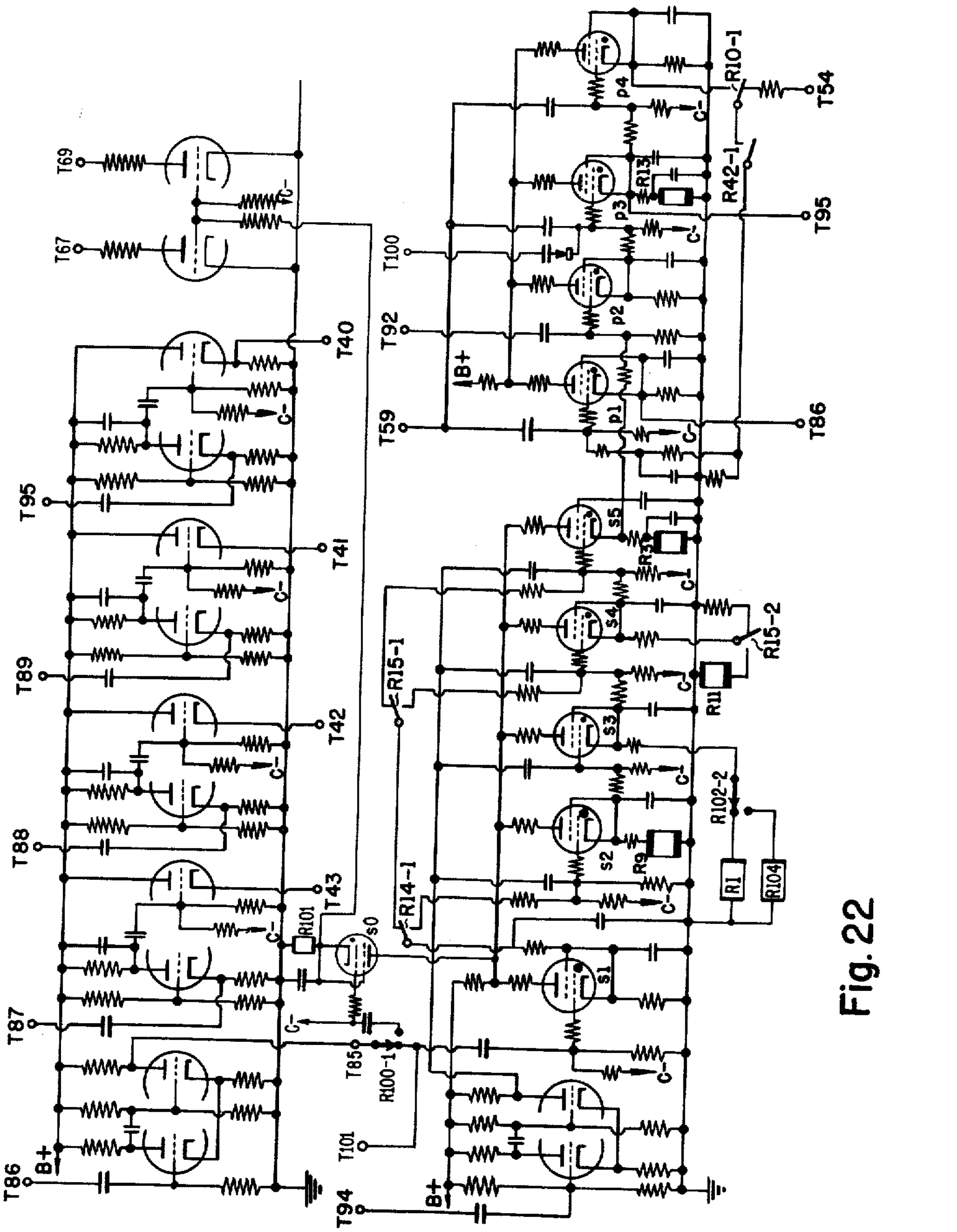

Figs. 3 and 3*a* are charts outlining the category headings and transaction symbols;

Fig. 4*a* is a view in side elevation of the storage drum and associated elements;

Fig. 4*b* is a view in cross section along the lines 4—4 of Fig. 4*a*;

Fig. 5 is a block diagram showing the interconnection of elements for the single operation of reading one digit of one category of one inventory item;

Fig. 6 is a block diagram showing the interconnection between elements for reading "status" from the drum;

Fig. 7 is a wiring diagram showing the various circuits established by the item index stepper switches;

Fig. 8 is a wiring diagram for the servo motor which positions the data head;

Fig. 9 is a wiring diagram for the stepper switch homing circuits;

Fig. 10 is a wiring diagram for the circuits established by the category keys;

Fig. 11*a* is a wiring diagram for the circuits established by the keys of the keyboard;

Fig. 11*b* is a wiring diagram for the basic power supply of the apparatus;

Fig. 12 is a wiring diagram for the index head and index amplifier;

Fig. 13 is a wiring diagram for selection rings A and B;

Fig. 14 is a wiring diagram for selection rings C and D;

Fig. 15 is a wiring diagram for the basic match element in the section circuits;

Fig. 16 is a wiring diagram for the carry-one counter;

Fig. 17 is a wiring diagram for the adding ring and printer;

Fig. 18 is a wiring diagram for the data head as well as for the reading and writing gates;

Fig. 19 is a wiring diagram for the digit ring;

Fig. 20 is a wiring diagram for certain of the output circuits of the digit ring;

Fig. 21 is a wiring diagram for the category ring together with certain of its output control circuits; and Fig. 22 is a wiring diagram for the step and position counters.

I. GENERAL

Figure 1:
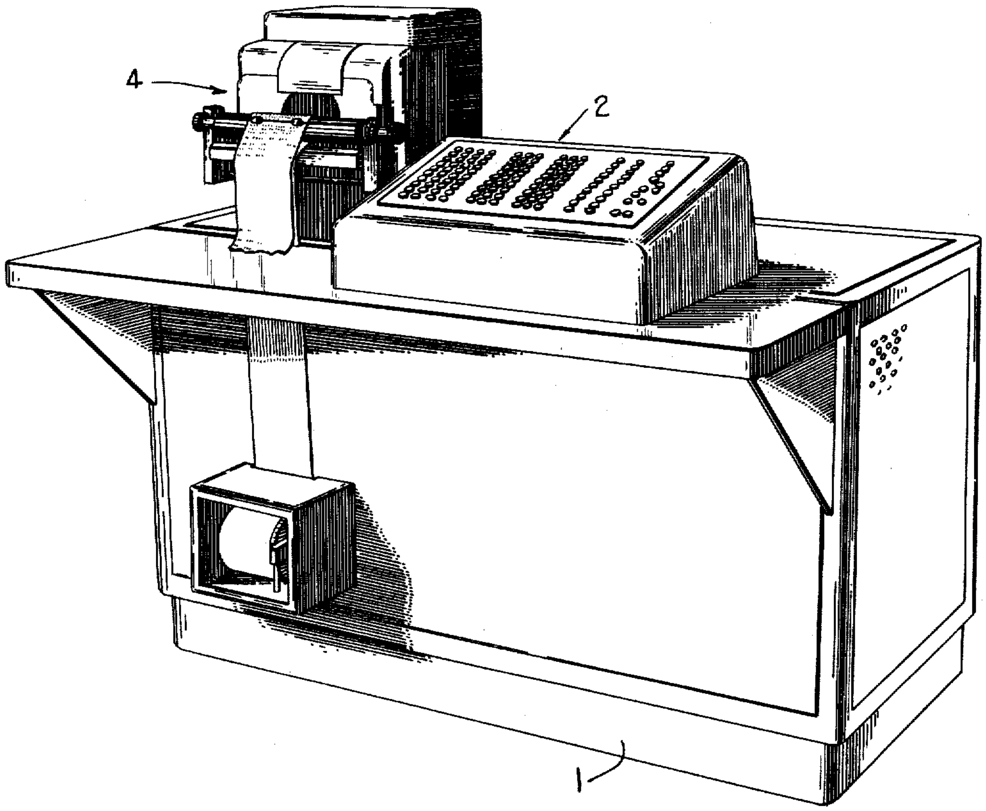
Fig. 1 is a view in perspective of the apparatus of our invention.

The preferred embodiment of our invention herein described comprises a main frame or cabinet 1 shown in Fig. 1 upon which is mounted a keyboard unit 2 and an electrical printer 4. These two units are the only visible operating elements of the machine. Inside the cabinet numerous chassis (not shown) serve to mount the various electrical circuits employed in controlling the apparatus. These circuits are shown in detail in Figs. 7 to 22. Also inside the cabinet are mounted certain other operating physical elements of the device. This detailed description will undertake first to describe the structural elements of the apparatus and will proceed thereafter to outline the control circuits and procedures of operation.

II. OPERATING STRUCTURAL ELEMENTS INSIDE CABINET

The principal operating structural element inside the cabinet 1 is a rotating storage drum 40 which is provided with a magnetizable surface. The drum 40 in the preferred embodiment is an accurately machined, solid aluminum cylinder. It is mounted for rotation in bearings 42 mounted within the rigid upstanding end walls 44. The bearings 42 may preferably be thoroughly cleaned, pre-loaded ball bearings of the conventional type. The upstanding end walls 44 are supported by resilient mounting feet 45 on a bed frame 46 which is in turn mounted within the cabinet 1. At one end a support bracket 48 is attached to end wall 44 and serves to support a motor 50 which drives the drum 40 in rotation through a coupling 52. The motor 50 is a conventional induction motor and is adapted to drive the drum 40 at a rate of approximately 600 r.p.m. (1/10 sec. per revolution).

At each side of the drum 40, the end walls 44 are further buttressed by longitudinally extending cylinders or stringers 54 (one of which is shown in Fig. 4*a*). The stringers 54 serve to mount intermediate supports 56 which pass over the top of the cylinder 40 in close relationship thereto. Near the upper portion of the drum 40, the end walls 44 and the intermediate supports 56 serve to support two longitudinally extending rail supports 58 made of solid steel for rigidity purposes. The rail supports 58 extend through the end wall 44 at one end and serve to support a servo motor M which is used in driving a data head carriage 64 longitudinally of the drum, as will be described more in detail presently.

The end walls 44 and intermediate supports 56 further support depending plates 60 which in turn mount four longitudinally extending conducting bars 62 for the sliding contacts for the various electrical connections associated with the data head.

Rails 63 for the data head carriage 64 are mounted on the rail supports 58 and extend inwardly therefrom to provide a fixed travel position for the data head carriage 64 along the said rails 63 on several sets of wheels 66 and 67. It will be understood, of course, that the position of the data head relative to the drum 40 is extremely critical and, therefore, the wheels 66 and 67 are adapted to hold the data head carriage in a highly uniform position relative to the rails 63. This is accomplished by mounting a pair of wheels 67 having vertical axis on one side of the data head and a single wheel 67 on the other side of the data head bearing laterally against the edge of rail 63 by means of a spring pressure mounting in the bearings of the later-mentioned wheel 67. The wheels 66 bear on the rails 63 from above and below and are mounted with two pairs on one side and one pair on the other. The wheels 66 on the underneath side are spring loaded to bear against the bottom surface of the rail 63 under spring pressure.

The data head carriage 64 carries a magnetic reading and writing data head 68 which comprises a core with a prominent pole face, containing a core gap and two coils wound on the core. The pole face is the part of the head nearest to the magnetic recording surface of the drum. The drum surface immediately adjacent to the head pole face magnetically shunts the head core gap hence a magnetizing current flowing in either of the head coils will magnetize the drum area adjacent thereto for "writing" purposes, and conversely, remanent magnetism in the small drum areas or cells passing adjacent to the head will induce coil voltages for "reading" purposes. The smaller the dimensions of the core gap and clearance mentioned, the greater the number of distinguishably individual magnetized spots on the drum surface can be recorded and read, that is, the more efficient the utilization of the available drum surface will be realized. As was previously mentioned, we maintain the gap at about .0006″ with a variation therein of no greater than .0003″.

Further adjusting and accurate positioning of the head is accomplished by means of small pieces of shim stock 69 which are placed as spacers between the rails 63 and the rail supports 58.

The data head carriage 64 carries four separate sliding electrical contact springs 70 which bear against the conducting bars 62 and serve to transmit electrical currents as appropriate to and from the data head 68 and other elements of the apparatus to be described later.

At one side of the data head supported by spacers 72 and a horizontally extending bar 74 is a slide wire resistor 78 which comprises a continuous winding which is separated into ten equal sections by eleven tap wires 84. The resistor 78 is employed in conjunction with a potentiometer circuit to be described later to position the head in any one of 500 separate locations longitudinally of the drum, each such position being related to a separate winding of the resistor.

The carriage 64 is driven longitudinally of the drum 40 by means of a pulley wire 88 connected to the carriage by an arm 89, passing over a pulley 90 at one end of the machine and a pulley 92 at the other end of the machine. A servo motor M drives the pulley 92 through an appropriately designed reduction gear (not shown), and hence positions the carriage 64 longitudinally of the drum 40.

At one end of the drum 40, an index head 86 is mounted in close association with the surface of the drum. The index head 86 is similar in its internal structure to the data head 68 in that it can establish or detect magnetized areas on the surface of the drum. On the other hand it will be seen that the index head 86 is not mounted for longitudinal motion relative to the drum, and it, therefore, is concerned only with a single and fixed peripheral track about the surface of the drum 40. This latter track will hereafter be referred to as the "index track."

III. READING "STATUS" FROM THE DRUM

The description of the preferred embodiment herein shown will now proceed by taking the comparatively simple operation of reading stored information from the drum, and explaining, first, how the keyboard is employed to position the data head 64 properly on the drum and then how the various electrical circuits are employed to select the proper digits and control the printer to produce the printed record of information desired. After covering this first and comparatively simple operation, this description will then proceed to a similar description of further and more complicated operations and by adding to the functions previously covered, complete the detailed description.

One of the simplest operations performed by the apparatus is that of reading "status" data from the drum.

As above indicated, we have arranged the various categories of information into two groups. The first group has been labeled the "Status" group and contains the first four categories; namely, "on order" (three digits), "warehouse" (three digits), "floor stock" (one digit) and "repair shop" (one digit). The second group is labeled the "Activity" group and contains the "period receipts" (three digits) and "period sales" (three digits). A printed line representing the "status" of an item numbered 1357 and using hypothetical figures for the remaining values might appear as follows:

| *Item Index* | *On Order* | *Warehouse* | *Floor Stock* | *Repair Shop* |
|---|---|---|---|---|
| 1357 | 150 | 020 | 8 | 2 |

When the operation of reading "status" from the drum is desired, the operator depresses the item index keys 1357 in the left-hand columns of the keyboard, and then he depresses the key at the right-hand end of the keyboard labeled "read." The keys in the middle or "category" columns have no effect in this operation. Care must be taken to see that the "activity" key in the first column of the transaction keys is not also depressed at this time because when it is depressed concurrently with the "read" key the machine will read the "activity" categories rather than the "status" categories. This may be avoided simply by depressing another key in the same keyboard column as the activity key. The keys in each column with the exceptions of the "transact" key and the "read" key are mechanically linked so that when one key in the column is depressed, it simultaneously lifts any other depressed key, as in conventional adding machines. For convenience and uniformity, operators are instructed to depress the No. 1 or "sale" key for the purpose of lifting the "activity" key.

(A) *Function of item index keys*

The general function of the item index keys in the reading operation as well as in other operations, is to condition the apparatus to read only digits relating to a particular item of inventory. The index keys accomplish this first by establishing a circuit which is employed to position the data head in one of five hundred selected positions longitudinally of the drum. When in the said selected position, the data head will then read digits relating to 20 separate items stored in each circumferential track around the drum, and therefore, an additional function of the item index keys is to establish circuits for selecting digits relating to only one of the said 20 items in the said circumferential track. A third function of the item index keys is to establish circuits for printing out the item index numbers at the end of the operation. Perhaps it should be explained at this point that the printer starts at the right-hand end of the printed line and proceeds from right to left. This is done to simplify the problem of carrying digits in the operations involving addition and subtraction to be explained later. A fourth function of the item index keys is in controlling stepper switches which establish the circuits required to perform the first three functions mentioned.

(B) *Multiple bank stepper switches*

(1) HOMING CIRCUITS

The item index keys carry out their functions by means of multiple bank stepper switches, one stepper switch being associated with each column of item index keys. Each stepper switch has five banks of ten contacts each, and all five banks are mounted to step in unison with the switch. The first bank in each stepper switch is employed to operate a hold-off relay in the driving circuit for the stepper switch itself. The operative wiring diagram for these switches is shown in Figs. 7 and 9, where it will be seen that relays R31, R32, R33 and R34 serve the purpose of breaking the circuit to the stepper switch drive motors M1, M2, M3 and M4. These circuits may be described as simple homing circuits. When a new item index key is depressed, the key in that same column which was previously depressed is mechanically lifted as in conventional adding machines, and the circuit to the associated hold-off relay is broken. The result then is to cause the related stepper switch motor to function to drive the stepper switch and all of its four banks around until the circuit to the hold-off relay is again completed by contact through the first bank of the said stepper switch, at which point the stepper comes to rest in the position corresponding to the new key digit.

(2) HEAD POSITIONING POTENTIOMETER CIRCUIT

Another function of the contacts in the item index stepper switches is to establish the circuit for positioning the data head longitudinally of the drum. This is done by means of a potentiometer circuit illustrated in Fig. 7 where it will be seen that only the stepper switches relating to the 1000's digit (second and third banks), the 100's digit (second bank) and the 10's digit (third and fourth banks) of the item index numbers are employed. The 1's digit stepper switch is not used in this particular function. Reference to Fig. 7 will further show that the 10's and 100's stepper switches establish one of 50 possible reference voltages which together with resistances at each end form one side of the potentiometer circuit. The other side of the potentiometer circuit is formed by one of the ten sections of the slide wire resistor between the top lines as selected by the 1000's key stepper switch. When the circuit is in unbalance, a voltage appears at terminal T38 which is detected by a phase sensitive amplifier (see Fig. 8), and results through the servo motor M in driving the data head in the appropriate direction to bring the slide wire and hence the circuit into balance. In this preferred embodiment the source voltage is 6.3 volts, and a voltage at T38 equivalent to the difference between any two adjacent reference voltages, in this case .12 volt, is sufficient to drive the servo motor at full speed while the amplifier is capable of detecting a voltage one-fourteenth of that value. When the slide wire contact is outside of the section of the slide wire selected by the 1000's stepper (as is actually shown in Fig. 7), the voltage at T38 will vary according to the settings of the 10's and 100's steppers, but it cannot fall below the .12 volt level (in this illustration) because the end resistors in the reference voltage circuit are adapted to provide this voltage even in the extreme key setting position. Thus under all conditions the servo motor will drive the data head from one position to the next initially at full speed, and one of 500 possible positions for the head may be selected while employing only 50 reference voltages. Since the servo amplifier (see Fig. 8) draws practically no current, the resistance in the slide wire for positions outside of the selected section may be ignored. This arrangement has the further advantage of providing for over travel of the head. If the slide wire contact travels beyond the last tap line, one of the end resistors will ensure its return regardless of the 100's and 10's key setting. A relay R42 is likewise associated with the output of the potentiometer circuit and operates only when the data head has reached the desired position longitudinally of the drum and current is no longer being supplied through terminal T38. The hold-off relay R42 prevents any further functioning of the apparatus until the data head is properly positioned.

(3) SELECTION OF ITEM

It has been explained that a combination of the contacts of the 1000's, 100's and 10's stepper switches serves the function of placing the data head in one of 500 possible positions longitudinally of the drum. This means that the data head will be in position relative to a single data track on which is stored the information relating to 20 separate items. The next problem is how to select one item only of the 20 items on the particular data track. This is accomplished by electronic counting circuits controlled initially from the 10's and 1's item index digit stepper switches. Circuits for this purpose are established by the second bank of the 10's digit item index stepper switches and the second, third and fourth banks of the 1's digit item index stepper switches. Reference to Fig. 7 will show that, depending upon the item index digit selected, it is possible to energize terminals T27—T30 and T31—T35 in one of 20 different combinations of pairs. That is to say that if the "0" key of both the 10's and 1's column is depressed, terminals T27 and T31 will be energized; if the "0" digit of the 10's column is depressed and the "1" digit of the 1's column is depressed as is shown actually in Fig. 7, then terminals T38 and T32 will be energized. The sequence is carried on thereafter and the 1's and 10's digit keys are thus capable of establishing 20 different combinations of pairs. How these combinations are employed to select the data relative to a given item index number will be further described presently.

(4) CIRCUITS FOR PRINTING ITEM INDEX NUMBERS

The stepper switches are also employed in establishing circuits directly from the item index system to the printing system for the purpose of printing the item index number at the end of an operation. For this purpose, the fifth bank of the 1's, 10's and 1000's and the third bank of the 100's stepper switches are employed. Reference to Fig. 7 will show that terminals T1—T10 are connected to each stepper switch, and that the selection of the particular item index keys determines which terminal will be energized. The terminals T1 to T10 go directly to the printing unit (see Fig. 17) where they serve to print digits 0 to 9 respectively. It will be further seen with reference to Fig. 7, therefore, that an electrical impulse entering the 1's digit stepper switch through terminal T36, will pass out terminal T2 as shown, and will result in printing the digit "1." Similarly, an electrical impulse in terminal T37 enters the 10's digit stepper switch and effects the printing of a "0" as shown; an impulse in terminal T37 enters the 100's digit stepper, leaves via terminal T3 and prints a "2," and lastly an impulse in terminal T40 enters the 1000's digit stepper switch, leaves via terminal T4, and results in printing a "3." Printing these digits separately and in the proper sequence is done by controlling the timing and sequence of pulses through terminals T36, T37, T39 and T40 as will be further explained later.

(C) *Reading one digit from drum (preliminary discussion)*

Attention will now be directed to the problem of reading a particular digit of a particular category of a particular item from the drum, because it is believed that once this isolated part of the reading "status" operation is explained, further operations of the apparatus will be more easily understood. Reference will be had particularly in the explanation of this function to Fig. 5 where the operation is set up in block diagram form. In the illustrative example shown in Fig. 5, the stepper switches of the 10's and 1's digits have been employed by way of example to energize terminals T29 and T32 which are indicated for this purpose with heavy lead lines. Also in heavy lines are terminals T62 and T69. The heavy lines are employed here to indicate that these latter terminals have been energized by means of a control unit which will be more fully explained hereafter.

The selection of the digit to be read is accomplished by four electronic counting rings labeled for convenience A, B, C and D. These rings comprise electronic vacuum tubes and their circuitry is shown in detail in Figs. 13 and 14 where it will be seen that the first tube in each ring when fired primes the next tube in succession such that an impulse on an associated bus line (T58 for rings A and B and T61 for rings C and D) serves the purpose of firing the next succeeding tube in line and extinguishing the previously fired tube. The last tube in each ring primes the first tube and therefore the tubes are fired continuously in succession. These electronic counting rings are well known in the art and will not be further described herein.

Turning now to the circuits established as shown in Fig. 5, it will be seen that terminals T27—T35, T62—T64 and T66—T70 connect through matching circuits to the output leads of the respective tubes of rings A, B, C and D. These matching circuits are adapted by means of crystal diodes to pass current into bus lines associated with each said ring only when a tube and its associated terminal are energized concurrently. As shown for illustration in Fig. 5, terminals T29, T32, T62 and T69 are energized, and therefore current will pass through the bus line of ring A only when tube 3 is fired, ring B only when tube 6 is fired, ring C only when tube 10 is fired and ring D only when tube 16 is fired. The bus lines of rings A and B pass to a further matching circuit which passes current only when both bus lines are energized. The matched resultant of rings A and B issues through terminal T60 (see also Fig. 13). Similarly, the bus lines of rings C and D pass into a match circuit and when energized concurrently they issue a signal through terminal T65 (see also Fig. 14).

(1) INDEX TRACK, READING HEAD AND AMPLIFIER

Turning attention now to the lower left-hand portion of Fig. 5, it will be seen that the drum 40 has associated therewith, an index head and a data head. The index head is located in a fixed position at one end of the drum and the data head, although movable longitudinally, has now been positioned adjacent to one of the 500 possible data tracks each of which carries the stored data for 20 separate items. The index track at the end of the drum is set up with 2700 separate permanently magnetized areas or cells therein and a dead space representing approximately 5% of the drum area between the last one of the 2700 cells and the first one. For the purposes of this discussion the dead space will be treated as coming at the start of each revolution of the drum. While the apparatus is in operation, the drum rotates continuously and the index head picks up and transmits a pulse for each one of the 2700 cells in the index track. These pulses are passed to an index amplifier which is employed for four separate functions for which it develops four separate signals emitting from the index amplifier on terminals T56, T57, T58 and T59. The operative wiring diagram for the index head and amplifier is shown in Fig. 12.

(2) RESET PULSE

At T56 the index amplifier emits a strong pulse at the end of each revolution. This pulse is passed directly to the first tube in each of the four selection counting rings and is adapted to serve the purpose of resetting these tubes prior to the commencement of operations. In normal sequence, the tubes will all return to their initial position after 2700 impulses, but it is possible that, when the machine is turned on after a period of idleness, the rings may not be in the starting position with the first tube in each ring fired, and the signal on T56 insures proper resetting under such conditions.

The reset pulse in terminal T56 as well as a "marker" pulse in terminal T59 (to be described more in detail below) are generated at the end of the revolution when the last of the 2700 index cells passes the index head, by means of a simple diode detector 96 (see Fig. 12). This detector is connected to the output of the index amplifier and generates a hold-off signal during the passage of the 2700 index pulses. When these cease, the detector receives no signal, the hold-off voltage disappears, and a pulse is generated in terminals T56 and T59.

(3) 2700 INDEX PULSES

The index amplifier further emits through terminal T58 amplified pulses corresponding to each one of the 2700 magnetized areas or cells on the index track. These pulses in terminal T58 drive both rings A and B and since ring A has four tubes and ring B has five tubes, these rings follow a sequence of 20 pulses before tubes 1 and 5 again come on concurrently. Following the sequence of the tubes in rings A and B, it will be seen that tubes 4 and 7 will be fired concurrenlty on the 7th, 27th, 47th, 67th, etc. pulse emitting through terminal T58 from the index amplifier, and when this occurs the bus lines of rings A and B match and a pulse emits through terminal T60. Essentially this matching is accomplished by means of crystal or vacuum diodes illustrated in Fig. 13 by the various arrow and doubleline symbols associated with each bus line. Two of these diodes serve to clamp the bus lines at a given voltage which in this illustration is 235 volts (see voltage divider in upper right area of Fig. 13). A match between a given tube and its associated terminal effects a voltage drop in the associated bus line, but this voltage drop is not effective at the condenser in the upper right corner of the figure until the voltage drop occurs in the bus lines of both rings simultaneously. This simultaneous drop is amplified and emitted at low impedance on T60. Other matching circuits employed herein are similar and therefore they will not be described in detail.

(4) SELECTION (MATCHING SIGNALS)

Tubes 4 and 9, the last tubes in rings A and B, serve the additional purpose of providing a signal for driving rings C and D. Thus on the 20th pulse originating in T58, tubes 4 and 9 will be fired concurrently and a matched signal coming from these tubes on separate lines will emit through terminal T61 to drive the tubes of rings C and D. Simple computation shows that for each drum revolution, 135 pulses will emit through terminal T61. Further simple analysis of rings C and D shows that they will complete their cycle once for every 15 pulses through T61 and that tubes 10 and 16 will be fired concurrently only 9 times during one drum revolution, that is, on the 4th, 19th, 34th, 49th, etc. pulse through T61. When the two designated tubes in rings C and D, in this instance tubes 10 and 16, are fired concurrently a matched signal emits through terminal T65. The signals in T65 last as long as tubes 10 and 16 are fired concurrently, which interval actually is the same length of time that it takes rings A and B to complete a cycle of 20 drive pulses, and therefore, while T65 contains a signal, one index track pulse must emit through terminal T60, and this will occur when, in this instance, tubes 3 and 6 are fired concurrently. Terminals T60 and T65 enter a further match circuit (labeled "Basic Match" in Fig. 5, see also Fig. 15) where they are matched with a signal from the index amplifier entering through terminal T57. Thus a pulse issues from the basic match circuit on terminals T71 or T72 only when terminals T57, T60 and T65 supply concurrent signals. By reference to Fig. 15 it will be seen that the pulses on T72 are delayed by a lumped delay line of choke coils and condensers. The purpose for the delay of the pulse in T72 is to equal the delays inherent in the circuits employed for reading pulses from the data head (see Fig. 18), and therefore the valves of the circuit elements shown in Fig. 15 are selected accordingly. In the present embodiment the delay is approximately six microseconds.

The pulses in T57 employed for the basic match are of short duration and correspond only to a part of each pulse generated by the cells on the index track. Thus the basic match issues on terminal T72 a pulse of similarly shortened duration. The pulse is shortened in order to facilitate discrimination between "count" and "no count" cells on the data track. It will be understood that the cells in the data track generate complete sine waves in the reading element and that the only difference between "count" and "no count" cells will be that of phase. In Fig. 18 it will be further seen that the tube associated with terminal T72 will only fire when the pulse from the data track and the pulse in terminal T72 are simultaneously in phase. By making the pulse in terminal T72 of shortened duration and by governing its time of appearance, it is possible to pass through the read gate only those data pulses of one phase, or in other words, only the "count" pulses. It will be understood, of course, that this arrangement may be readapted by changing the time of appearance of the pulse in T72 or by inverting its phase to read the "no count" (or 9's complement) pulses if desired. The "count" pulses, or the pulses to be read issue from the read gate on terminal T75 and serve to drive the adding ring (Fig. 17).

(5) READ GATE, ADDING RING AND PRINTER

The pulses emitting at terminal T72 are transmitted to a read gate (see also Fig. 18) where they serve the purpose of conditioning the read gate to pass information from the data head to the adding ring at the precise instant only when a pulse appears in T72. The read gate is further controlled by a signal entering through terminal T83 from the control unit (to be described later). The signal in T83 further conditions the read gate for passing the pulse from the data head to the adding ring and therefore terminals T72 and T83 must both be energized concurrently before a pulse can pass through from the data head to the adding ring on terminal T75 (see Figs. 18 and 17). The reason for this further control of the read gate through terminal T83 is that there are other operations in which it is not desired to pass information to the adding ring, as for instance when it is desired to print a space rather than a digit. The read gate performs one final limiting function, it passes to the adding ring only pulses corresponding to reversely polarized cells in the data track since these pulses only represent units of stored digits.

Referring again to Fig. 5, it should be understood that the adding ring is reset each revolution by a signal entering through T44 from the control unit shown diagrammatically in the upper right-hand corner of Fig. 5. The control unit is keyed initially by a pulse issuing at the end of every revolution from the index amplifier on terminal T59 and in addition to resetting the adding ring, the control unit simultaneously emits a pulse through terminal T81 to the printer. The printer is appropriately primed by that stage of the adding ring which is on at the end of the revolution and the pulse through terminal T81 actuates the printer to print the digit corresponding to the primed stage of the printer.

(6) SUMMARY OF READING ONE DIGIT

Thus during the operation of reading one digit of one category of one item, the index head picks up 2700 pulses from the index track, the rings A, B, C and D select 9 of these pulses relating only to the designated digit, category and item. These pulses are cut in half by matching with the signal in T57, and are used in part to actuate the read gate. The read gate, when further actuated by a signal in T83, passes to the adding ring pulses corresponding to the reversely polarized cells on the data track appearing concurrently with pulses from the basic match through terminal T72. The total of these pulses represents the value of a stored digit. Thus if 5 cells are polarized reversely, 5 drive pulses will emit through terminal T75 to the adding ring and the stage of the adding ring corresponding to the digit 5 will be fired and will prime the printer to print the digit 5. Thereafter the print pulse on T81 prints the digit and the pulse on T44 resets the adding ring. It will be seen that printing other digits of other categories may be controlled by energizing a different combination of terminals T62—T64 and T66—T70, and that digits relating to another item on that same data track may be printed by establishing a different combination in terminals T27—T35. Since the cells relating to any given digit are spaced around the drum, the rate at which the pulses reach the adding ring is relatively slow, and in this example, well within the frequency limits of the thyratron tubes employed on the said adding ring.

Before passing to further discussion, it should be explained that, while the pulses on T44 and T81 occur simultaneously, the priming voltages applied to the printer from the adding ring remain in force sufficiently long to cause the printer to print the correct digit before the change in the adding ring can change the effective priming voltage to the printer.

(D) *The control unit and its function in reading "status" from drum*

Having explained how a single digit is selected and read, this description will now proceed to describe the control unit, how it sets in motion the operation of reading "status," and printing the proper digits at the proper time.

The principal elements of the control unit are (*a*) a position counter, (*b*) a step counter, (*c*) a category ring, and (*d*) a digit ring. These elements comprise groups of thyratron tubes connected in most instances so that when one tube is fired, a part of its output voltage is employed to prime another tube in the group. The distinction between the terms "ring" and a "counter" as herein employed is that the last tube in a "ring" primes the first tube, while in a "counter" the last tube does not prime the first. Thyratron tubes are employed in these control units because they have a low impedance and do not require shielding or buffer circuits to prevent interference between signals.

Detailed operative wiring diagrams for these control rings and counters are shown in Figs. 19, 21 and 22 where the tubes of the digit ring are labeled *d*1 to *d*7, the tubes of the category ring are labeled *c*1 to *c*5, those of the step counter *s*1 to *s*5, and *p*1 to *p*4 for the position counter.

In the description of reading "status," reference will be had to Fig. 6 for a general understanding of the interconnection between the various control elements and the other parts of the apparatus for this one operation, while the detailed wiring diagrams may be referred to for an understanding of how the circuits perform individually.

It is important to bear in mind that Fig. 6 shows only the interconnection of the control elements for the "read status" operation. For other operations, relays not shown in Fig. 6 are operated by other transaction keys on the keyboard and bring about different interconnections within the control unit.

(E) *Sequence of steps in reading "status" from drum*

(1) DEPRESS INDEX KEYS

In reading "status" the operator first depresses the item index keys. This causes the servomotor M to position the data head on the drum, and also conditions the selection rings A and B for the selected item. It should be remembered that the drum is rotating continuously and the index head is constantly picking up the signals of the index track. Also the index amplifier is constantly putting out the marker pulse on terminal T59 at the completion of each drum revolution. This latter mentioned marker pulse on T59 is highly important because it keys off the control unit and serves as a basic drive pulse to advance the tubes of the rings and counters of the control unit from one position to another.

(2) DEPRESS "READ" KEY

After depressing the item index keys, the "Read" key is depressed (see Fig. 11), and as soon as relay 42 (see Fig. 8) operates by virtue of the potentiometer circuit coming into balance (and hence the data head coming into position), a circuit is completed through terminal T54 to the *p*1 stage of the position counter (see Fig. 22). This circuit primes the *p*1 stage which will thereafter fire upon receipt of the next marker pulse from the index amplifier on T59.

(3) FIRST MARKER PULSE ON T59

Upon receipt of the first marker pulse after being primed, stage p1 of the position counter fires and commences conducting through terminal T86. The signal on T86 in part primes stage d1 of the digit ring and also serves to actuate a reset pulse on terminal T85 (see Fig. 22 upper left). The reset pulse on T85 goes to the first stages of the digit and category rings and the step counter and resets them to their respective first stages.

(4) EFFECT OF FIRING STAGE *d*1 OF DIGIT RING

With reference to Fig. 6 it will be seen that the output of stage d1 of the digit ring is used for a number of purposes. First, d1 primes *d*3 in the digit ring. This is shown in Fig. 6 by a simple arrow from d1 to *d*3. (Tubes d2, d4 and d6 are bypassed in the operation of reading "status.") Other uses for the output of d1 are shown stemming initially at terminal T87. When T87 is energized, terminal T64 is likewise energized and ring C of the selection rings is thereby conditioned to select the third digit (it being remembered that in printing from right to left the third digit is read first). T87 further serves to energize terminal T82 (see Fig. 20) which in turn causes the printer to print a space (see Fig. 17). Thus a space mark is printed whenever d1 is fired and serves to separate groups of digits appearing in the printed line. The fact that a space mark is printed initially, however, is of no consequence, and would be more troublesome to eliminate than to leave in.

Another function of the signal from d1 on T87 is to reset the adding ring to zero. This is done by shaping the signal on T87 (see Fig. 22) and transmitting it through T43 to the keyboard (see Fig. 10). The relays associated with the input terminals of the keyboard (R's 35—39), however, are in their normal position and therefore the key terminals are by-passed and the signal emits on T44 where it passes to the zero stage of the adding ring (see Fig. 17) resetting the same to zero. The final function of the signal from d1 is to condition the "read gate" through terminals T83 (see Fig. 18). This is done by passing the signal from d1 (T87) through an amplifier to T83 (see Fig. 20).

(5) EFFECT OF FIRING FIRST STAGE OF CATEGORY RING

When the signal on T85 resets the category ring at the start of the first cycle, tube c1 serves first to prime tube *c*4 on the category ring. (Tubes *c*2 and *c*3 are by-passed for the "read status" operation.) Another function of c1 is to pass a signal out on terminal T94 which is used to condition the selection ring D through terminal T68, and also to energize the solenoid of relay R2.

(6) EFECT OF FIRING FIRST STAGE OF STEP COUNTER

When the signal n T85 resets the step counter to stage s1, the only result is to prime stage *s*5 in the same counter. (Stages *s*2, *s*3 and *s*4 are by-passed in the "read status" operation.)

(7) FIRST DEAD SPACE AFTER FIRST MARKER PULSE

It will be remembered that the dead space on the drum is treated herein as being at the start of the drum revolution. Immediately following the first marker pulse, selection rings C and D become conditioned to read the digit called for by the digit and category, a print space signal is transmitted to the printer and the adder is reset to zero. These operations take place during the dead space within a few microseconds.

It should be pointed out that the first two categories to be printed are categories 4 and 3 in that order. These are the single digit categories representing quantities on the "sales floor" and quantities in the "repair shop." Stage *c*1 of the category counter is used for reading both of these categories and also takes care of printing a space marker between them as will be further described presently.

(8) FIRST DRUM REVOLUTION

After the first dead space has passed, pulses commence issuing from the index head through the index amplifier to drive the selection rings, match pulses commence issuing at terminals T60 and T64, and the data head is continuously picking up the pulses in the data track. When a first match pulse issues from the basic match on T72, it in effect opens the "read gate" and the last half of the cell on the data track adjacent to the data head at that instant is examined. If it is a reversely polarized cell, the read gate transmits a pulse through terminal T74 (see Figs. 17 and 18) and the adding ring is advanced from "zero" to "one." When the first revolution is completed, the reversely polarized cells of the digit examined have advanced the ring to the stage corresponding to the digit stored in the data track and the printer is primed to print a corresponding digit. The priming voltages to the printer from the adding ring are not sufficient in themselves to fire the printer but require an additional voltage on T81 to drive the printer.

(9) SECOND MARKER PULSE

The second marker pulse is sent out by the index amplifier on T59 immediately after the first revolution is completed. This marker serves to advance the digit ring from stage d1 to *d*3. The pulse in T59 also goes to the position counter but since stage p2 is not primed as yet, the position counter stays on p1 continuously conducting through T86. No new pulse emerges on the reset line T85 because the signal in T86 has not been interrupted.

The effect of advancing the digit ring to stage *d*3 is first, to prime stage *d*5 of the digit ring; secondly, *d*3 passes a signal through terminal T88 to the first set of contacts in relay R3 (see Fig. 20) which in the normal unenergized position routes the signal through terminal T81 to drive the printer. Thirdly, *d*3 passes a signal through T88 to an amplification stage (see Fig. 22) to T42 which leads to the keyboard diagram (see Fig. 10) where the key circuits are by-passed and the signal emerges on T44 to reset the adding ring to zero (see Fig. 17). The signals on T81 and T44 are concurrent but as was previously explained, the priming voltage lingers long enough to sum up with T81 to operate the printer before the adder completes its reset. Thus the digit entered in the adding ring on the first revolution (that is, the digit employed for inventory category 4) is printed at the start of the second revolution.

Stage *d*3 also energizes T83, the lead to the read gate (see Fig. 20), but as will be explained, the read gate receives no match signals on T72 during the second revolution.

(10) SECOND REVOLUTION

During the second revolution nothing is entered into the adding ring. If relay R2 were not energized, *d*3 would condition selection ring C to read a digit by energizing T63, but since relay R2 has been energized by category stage c1, the signal from *d*3 on T88 never reaches T63. Thus no matched pulses can issue to the read gate on T72 from the selection rings and the read gate passes nothing to the adding ring during the second revolution. The category ring, step counter and position counter remain at their initial stages during the second and third revolutions.

(11) THIRD MARKER PULSE

The third marker pulse on T59 advances the digit ring from stage *d*3 to *d*5. This results in: (*a*) priming stage *d*7, (*b*) passing a signal through T89 to T62 to condition selection ring C to select the first digit (in this instance the digit used for inventory category 3), (*c*) passing a signal through T89 to relay R3 (unenergized) to relay R2 (energized) and then to terminal T82 which results in printing a space (see Fig. 20), (*d*) stage *d*5 also resets the adding ring by a signal passing through T89 to T41 (see Fig. 22), and T41 to T44 (see Fig. 10), (*e*) finally *d*3 also passes a signal through T89 to T83 (see Fig. 20) to condition the read gate to pass data signals to the adding ring.

(12) THIRD REVOLUTION

During the third revolution data pulses pass through T75 to the adding ring as during the first revolution except in this instance the data relates to inventory category 3.

(13) FOURTH MARKER PULSE

The fourth marker on T59 advances the digit ring from stage *d5* to stage *d7*. This has the effect, first, of printing what is in the ring after the third revolution by means of a signal emitting through T90 to relay R3 (unenergized) to T81, the print pulse. Stage *d7* also provides a drive pulse on T92 for the category ring and in this instance drives it from stage *c1* to *c4*. This has the effect of changing the conditioning line to selection ring D from T68 to T67. T67 corresponds to inventory category 2 or "on order." t will be noted also that relay R2 is now deenergized (see Fig. 21). This effects the circuits established by stages *d3* and *d5* of the digit counter (see Fig. 19) to be further described below. Stage *d7* also primes stage *d1* of the digit ring.

(14) FOURTH REVOLUTION

The fourth revolution may be regarded as idle. It simply provides time for relays to operate where appropriate as well as time for the printer to complete printing the third digit. Nothing further happens until the fifth marker pulse comes on T59 from the index amplifier.

(15) FIFTH MARKER PULSE

The fifth marker pulse fires stage *d1* of the digit ring, and stage *d1* performs as it did on the first marker pulse. That is, a space is printed by means of a signal on T82, ring C of the selection ring is conditioned to read the third digit on T64, the read gate is conditioned to read through T83, the adder is reset through T44 and stage *d3* is primed.

(16) FIFTH REVOLUTION

During the fifth revolution, the adder collects pulses relating to the third digit of inventory category 2.

(17) SIXTH MARKER PULSE

The sixth marker pulse advances the digit ring from *d1* to *d3*. This results in a print pulse on T81 which prints the digit collected on the fifth revolution, an adder reset pulse on T44, a signal on T63 to selection ring C (since relay R2 is now unenergized), a priming voltage to stage *d5*, and a read gate signal on T83.

(18) SIXTH REVOLUTION

During the sixth revolution the adder collects pulses relating to the second digit of inventory category 2

(19) SEVENTH MARKER PULSE

The seventh marker pulse advances the digit ring from *d3* to *d5*, prints the second digit and prepares to collect the next or first digit as has been described and as should now be understood without repetition.

(20) SEVENTH REVOLUTION AND EIGHTH MARKER PULSE

The seventh revolution results in collecting into the adding ring the first digit of inventory category 2, and the eighth marker pulse results in printing it. The eighth marker also primes stage *d1* of the digit ring and through T92 serves to advance the category ring to stage *c5*. Category stage *c5* primes stage *c1* and through T66 conditions selection ring D to select digits relating to inventory category 1 or "warehouse."

(21) EIGHTH REVOLUTION AND NINTH MARKER PULSE

The eighth revolution passes without further effect and the ninth marker pulse, after printing a space, introduces the same digit reading sequence which started with marker pulse No. 5, except now the digits being read relate to inventory category 1. All this while the step counter and the position counter have remained at their initial stage.

(22) NINTH MARKER TO TWELFTH MARKER PULSE

From the ninth to the twelfth marker, the three digits relating to the "warehouse" category are printed, and on the twelfth marker, digit stage *d7* emits a signal on T92 which drives the category ring from *c5* back to *c1*. When this happens a signal emits on T94 from *c1*, and the step counter is advanced from stage *s1* to *s5*. Stages *s2*, *s3* and *s4* are by-passed in this operation. Stage *s5* has two functions. First, it energizes relay R3 and secondly, it primes stage *p2* of the position counter.

(23) THIRTEENTH MARKER PULSE

On the thirteenth marker pulse *d1* is again fired, having been primed by *d7*, and a space is printed by virtue of the usual signal from *d1* through T87 to T82 (see Fig. 20). The other functions of *d1* also take place but no print pulse appears on T81 at the end of the thirteenth revolution, and therefore, they may be disregarded at this point.

(24) FOURTEENTH, FIFTEENTH AND SIXTEENTH MARKER PULSES

The fourteenth, fifteenth and sixteenth marker pulses advance the digit ring from *d1* to *d3*, *d3* to *d5*, and *d5* to *d7* respectively. As this happens, pulses occur in sequence on terminals T88, T89 and T90. These pulses were previously employed in T81 to drive the printer but since relay R3 is now energized, they are channeled to terminals T36, T37 and T39 respectively through which they serve to print the 1's, 10's and 100's digits of the item index number in accordance with the positions of the respective item index keys.

The sixteenth marker pulse, by firing stage *d7* of the digit ring causes a pulse to occur on terminal T92 which is combined with the signal from stage *s5* of the step counter to fire stage *p2* of the position counter. (See Fig. 22.)

(25) SEVENTEENTH MARKER PULSE

The seventeenth marker pulse advances the position counter to stage *p3* which primes stage *p4* and produces a pulse on terminal T95 (see Fig. 22). The pulse on T95 is amplified and passes to T40 through which it serves to print the 1000's digit of the item index number (see Figs. 7 and 17). During the last two revolutions, after *p2* was fired, *p1* has been extinguished and since the sustaining signal in T86 is now terminated, the digit ring remains idle on stage *d7*.

Stage *p3* of the position counter also serves to energize relay R13. This relay operates the carriage return of the printer (see Fig. 11*a*).

(26) EIGHTEENTH MARKER PULSE

The eighteenth marker pulse advances the position counter to stage *p4* where it remains idle until a new operation is called for.

(F) *details of circuitry*

It should be understood that Figs. 5 and 6 are useful only in showing the interconnections between elements. The details of the circuits are shown in the operative wiring diagrams as indicated in the foregoing description. For instance, a simple inspection of Fig. 6 might lead one to question why a signal from T88 through T42 to T44 would not run back up to T43 to T87 and upset things by energizing T64 leading to selection ring C. A simple inspection of the tube arrangement in Fig. 22 for putting a signal in T43 from T87 will show that the signal from T87 merely fires a vacuum tube which establishes a further power circuit and that it is impossible for a signal to pass back from T43 to T87. Considerations of this type, as well as the values of the resistors whose functions are obvious, are believed to be adequately apparent to those skilled in the art from the detailed wiring diagrams shown in Figs. 7–22, and for this reason they will not be described further herein. However, it should be noted that one of the particular advantages of our arrangement is that all of its functions may be accomplished with commercially available elements including simple triodes, thyratrons and diodes which may be of the crystal or vacuum tube type. These elements are represented in the figures by the conventional symbols.

IV. READING "ACTIVITY" FROM DRUM

The activity categories are categories 5 and 6 and relate to period receipts and period sales respectively. Reading these categories from the drum is similar in many respects to reading "status." The only difference as far as the operator is concerned is that the "activity" key is depressed prior to depressing the "read" key. The activity key energizes relay R4 (see Fig. 11*a*) and three of the contacts of relay R4 take care of the entire change in the operation of the machine from read "status" to read "activity." The contacts of relay R4 are all shown in Fig. 21.

Contact R4–1 may be ignored for the moment because it depends upon terminal T93 being energized and reference to the upper left hand corner of Fig. 20 will show that unless relays R9, R40, or R104 are energized, T93 will not be. Neither relays R9, R40 nor R104 are energized for the operation under discussion.

Contact R4–2 serves the purpose of diverting the signal in T94 out of stage *c*1 of the category ring from terminal T68 to terminal T70. R4–2 also breaks the circuit to relay R2. The effect of this is to condition selection ring D to select inventory category 6 or "period sales" instead of categories 3 and 4. Also the effect of by-passing relay R2 is to avoid printing a space for the second digit as is done when reading inventory categories 3 and 4.

Contact R4–3 is in the output circuit for category ring stage *c*5 and directs the *c*5 signal from terminal T66 to terminal T69. (Terminal T69*a* should be ignored here because it is employed only in the "reorder" adaptation discussed toward the end of this description.) T69 conditions ring D of the selection counter to select inventory category 5 or "period receipts" instead of category 1.

Contact R4—4 is located in the priming circuits for the category ring and directs the priming signal from stage *c*1 directly to stage *c*5.

With this condition established by relay R4, when the operation starts with the digit and category rings and step counter reset to their respective initial stages, the sequence thereafter is virtually the same as for marker pulses 5 to 18 of reading "status," and need not be followed in detail. The operation starts with a space being printed, thereafter the three digits of inventory category 6 are printed as the digit counter advances to stage *d*7. When this happens the category counter is advanced directly to stage *c*5 after which another cycle of the digit counter results first in a space being printed and then the three digits of inventory category 5 are printed. After this, the step counter is advanced directly to stage *s*5, a space is printed followed by the item index numbers as for marker pulses 13 to 18 in the read "status" operation.

V. "LIST"

In addition to reading the "status" or "activity" category groups of one item, it may be desirable to compile a list of the "status" or "activity" groups of all items. This may be done by the "list" function of the machine for either category group alone or for both of them simultaneously.

(A) *Key entries*

When it is desired to compile a list of the "status" category of all titems, the operator first depresses the four zero keys in the item index columns, thereafter he depresses the "list" key and finally he depresses the "read" key.

(B) *Function of keys*

As will be seen by reference to Fig. 11*a*, the list key closes a circuit to the solenoids of relays R10, R18 and R19 which are employed in carrying out the "list" function. The circuits established by these relays will be discussed in order.

(C) *Relays R10, R18 and R19*

The function of the first contact of relay R10 (R10–1, see Fig. 22) is to channel the output of stage *p*4 of the position counter back to stage *p*1 of the position counter, thereby in effect reactivating the "read" operation at the end of the cycle without resorting to the "read" key. The second contact of relay R10 (R10–2) serves the purpose of maintaining current to the coils of relays R10, R18 and R19 and may be thereby considered as a holding circuit. The third contact of relay R10 (R10–3) serves the purpose of channeling part of the power switched by relay R13 to actuate the carriage return, to also actuate relay R31 for the purpose of advancing the step counters to select the next item in order. Relays R18 and R19 serve the purpose of channeling the pulse which passes through relay contact R10–3 to the relays R32, R33, R34 and R41 for the purpose of advancing the steppers of the item index system to the progressively more advanced digit stages where appropriate (see Fig. 9).

(D) *Operation*

It will be seen, therefore, that depressing the list key does not essentially disturb the read function but merely perpetuates it and adapts the apparatus continuously to read the item categories in sequence. After the appropriate keys have been depressed initially for this operation, the "read status" sequence previously described takes place for the first item of inventory and when the position counter reaches stage *p*3 practically at the end of the initial reading operation, relay R13 is actuated for the duration of one drum revolution, and during this time, since relay R10 is energized, a signal is passed through to relay R31 closing and advancing the 1's column stepper switch. Thereafter, at the next marker pulse on T59, the position counter advances to stage *p*4 and a signal at that time passes through relay contact R10–1 back to prime stage *p*1 of the position counter such that a new marker pulse (on T59) will fire *p*1 and commence the "reading status" operation again, but on this cycle, since the item index stepper switches are on a new item, the status information of the new item will be printed.

VI. "STOP LIST"

Reference to Fig. 11 shows that when relay R13 is operated the circuits to R10, R18 and R19 are momentarily broken. This has no effect actually on these relays because the "list" key remains engaged through the operation. If it is intended at any time to stop the list operation, a special "stop list" key is provided and merely serves the purpose of mechanically lifting the "list" key when it is depressed. When the "list" key has been lifted, the cycle runs through until the carriage return is actuated by relay R13 and, at that moment, the circuits to relays R10, R18 and R19 are broken and "listing" ceases.

VII. LIST "ACTIVITY"

Listing the "activity" category group is carried out in essentially the same manner as previously described for listing "status" categories except, in addition to the keys depressed, the "activity" key is also depressed and results in energizing relay R4. The effect of energizing relay R4 has previously been described in connection with "reading activity" and in this instance it simply shifts the apparatus from listing "status" to "listing activity."

VIII. "LIST ALL"

When it is desired to list all categories of an item rather than either the "activity" or "status" groups alone, the "read all" key is depressed along with the "list" key and the "read" key. The "read all" key energizes relay R45, which through the operation of its four contacts conditions the apparatus to read all categories in sequence rather than just one group of categories. Each contact of relay R45 is shown in Fig. 21 and the effect thereof will be apparent when the circuits it establishes are traced. Contact R45–1 is associated with stage *c*1 of the category ring and has the effect of priming the next stage *c*2 on the category ring rather than by-passing it as before. This causes each stage of the category ring to be fired in sequence. Contact R45–2 has the effect of channeling the signal from stage *c*1 to terminal T70 to condition selection ring D for selecting the "period sales" category. Contact R45–3 channels the signal of *c*3 from terminal T69 over to terminal T68 and also breaks the line from *c*1 to T69 by virtue of the contact R45–4. This latter circuit in addition to energizing T68 also energizes relay R2 so that a space will be printed between categories 3 and 4. The output lines from stages *c*2, *c*4 and *c*5 are not disturbed by relay R45 and they serve to condition section ring D through terminals T69, T67 and T66 to select inventory categories, "period receipts," "warehouse," and "on order" respectively. Since the "list" key is depressed at this time, the final stages of each reading sequence are accompanied by signals for advancing the index switches one unit and for recommencing the reading operation.

IX. "READ ALL"

All categories for a given item may be read by merely depressing the "read all" key and the "read" key. In this instance the apparatus functions as for "List All" except it does not continue to cycle through.

X. "POST ORDER"

The next operation to be discussed is that of posting an order. Essentially, this entails making an addition to inventory category 1 ("on order"), but certain of the steps, previously discussed, are repeated in order to provide a complete and easily understood printed line for the record. Thus when an order is posted, the machine is adapted first to print (from right to left) the "status" categories as they existed before the entry. Then the quantities to be entered are printed so that there will be a future record of the actual entry made. After this a transaction symbol (in this case the digit "3," see Fig. 3*a*) is printed so that the nature of the entry may be kept on record. Next to the left, the status categories are again printed, but this time the digits represent the values of the status categories as they exist after the entry. Finally to the left, the item index number is printed.

To use a hypothetical example for convenience, let us take an item numbered 1357, with 150 units in the warehouse, 20 units already "on order," 8 units on the sales floor, and 2 units in the repair shop. Also let us assume that it is now desired to post an entry of 95 more units "on order." For this entry, a printed line as follows will result:

| (1) | (2) | (3) | (4) | (5) | (6) | (7) | (8) | (9) | (10) | (11) | (12) | (13) | (14) |
|---|---|---|---|---|---|---|---|---|---|---|---|---|---|
| 1357 | 115 | 150 | 8 | 2 | 3 | 095 | 000 | 0 | 0 | 020 | 150 | 8 | 2 |

(1) Item Index
(2) Balance "on order"
(3) Balance "in warehouse"
(4) Balance "on salesfloor"
(5) Balance "in repair stock"
(6) Transaction symbol number
(7) Keyboard entry for "receipts"
(8) Keyboard entry for "warehouse stock"
(9) Keyboard entry for "salesfloor"
(10) Keyboard entry for "repair stock"
(11) Old balance "on order"
(12) Old balance "in warehouse"
(13) Old balance "on salesfloor"
(14) Old balance "in repair stock"

(A) *Key Entries*

The key entries for this will be as follows:

(*a*) Item index numbers 1357
(*b*) category 1 095
(*c*) category 2 000
(*d*) category 3 0
(*e*) category 4 0
(*f*) "post order" transaction key No. 3, and
(*g*) the "transact" key.

When the "transact" key is depressed, the effect is to energize relay R23. Relay R23 does two things, first it sets in motion the operation of reading "status" from the drum by completing the power circuit to terminal T54 (see Fig. 11*a* bottom), and secondly, it energizes relay R14 which causes the step counter to prime its tubes from stage to stage rather than by-passing stages *s*2, *s*3 and *s*4 as was the case in the previously discussed operations (see R14–1, Fig. 22).

Relay R14 also provides a contact R14–2 for the purpose of sustaining current in its own solenoid after the "transact" key, which is on only momentarily, turns off.

The "post order" key serves to energize relay R22 which later on causes the transaction symbol "3" to be printed when appropriate, as will be explained presently.

(1) FIRST PHASE: READING "STATUS" (FIRST TWELVE MARKER PULSES)

After the operation commences, the status categories are read and printed during the first twelve marker pulses as was previously described under "Reading Status from the Drum."

(2) SECOND PHASE: PRINTING KEYBOARD ENTRIES (TWELFTH TO TWENTY-THIRD MARKER PULSES)

On the twelfth marker pulse, the category ring is returned to stage *c*1 by a signal issuing on T92 from stage *d*7 of the digit ring. This corresponds precisely to the twelfth marker pulse of the "reading status" operation. However, when the category ring returns to *c*1 in this operation, a signal emits on T94 to the step counter, and instead of advancing directly to stage *s*5, the step counter advances to stage *s*2.

At stage *s*2 the step counter energizes relay R9. This relay has the following functions: (*a*) it breaks the circuit from the source of power to the read gate through terminal T83 so that nothing can be read from the drum to the adding ring (see Fig. 20), and (*b*) it makes a circuit from the source of power to relays R35—R39 through terminal T93 (see Fig. 21).

With the exception of R39 these latter relays, however, are not energized as yet but must await signals from the stages of the category counter as appropriate when the category counter advances.

Since the category counter is now at stage *c*1, the signal from *c*1 passing through terminal T94 also actuates an electronic switch that energizes relay R39 (see Fig. 21). The effect of this may be traced in Fig. 10 where it will be seen that contact R39–1 will take the signal from terminal T43 (which comes when stage *d*1 of the digit ring is fired on the next marker pulse) and channels it into one of the circuits established by the key column corresponding to category 4. These circuits pass through terminals T45—T53 directly to the adding ring and serve to "preset" the adder to the stage corresponding to the digit of the depressed key. It will be seen that this replaces the function of "resetting" the adding ring to "zero" previously discussed.

On the next marker pulse, the thirteenth in this instance, stage *d*1 in the digit ring is fired, and a signal passes through T87 and thence through T43 (see Fig. 22). Since relay R39 is energized, this signal serves to preset the adding ring to the digit corresponding to the key setting for category 4.

Also on the thirteenth marker pulse, the signal on T87 from *d*1 serves to print a space (see Fig. 20).

Since the read gate is now closed, the adding ring remains as preset during the ensuing revolution, and primes the printer to print the corresponding digit.

On the fourteenth marker pulse, the digit ring is advanced to stage *d*3 and a print pulse issues to print the inventory category 4 digit from the keyboard previously established in the adding ring. Also a signal issues on T42 but since a space is to be printed next the adding ring is merely reset to zero instead of being preset. The signal on T42 passes through to T44 in this instance (see Fig. 10).

On the ensuing marker pulses the digit ring cycles through from stage *d*3 to *d*5 to *d*7, back to *d*1 etc. and the category ring advances as is now understood. At category ring stage *c*4, relay R36 is energizes, and at stage *c*5 relay R35 is energized. These relays take the signals on terminals T43, T42 and T41 and direct them into the preset circuits established by the entry keys (see Fig. 10).

In this manner the data on the entry keys is printed during the twelfth to twenty-fourth marker pulses.

(3) THIRD PHASE: COMBINING ENTRY DATA WITH STORED DATA AND WRITING THE RESULTS INTO DRUM

On the twenty-fourth marker pulse, stage *d*7 of the digit ring is fired. This returns the category ring to stage *c*1, which in turn emits a signal on T94 to the step counter, advancing the same from stages *s*2 to stage *s*3.

Stage *s*3 energizes relay R1, one contact of which is employed to energize relay R40. These two relays establish the circuits for combining the stored data with the keyboard data and writing the result into the drum.

*(a) Brief general description of combination operation*

In a general sense, the operation of combining the keyboard data with the stored data is done by first presetting the adding ring to a given keyboard entry during the dead space of a revolution. Thereafter, the data on the data track (appropriately selected for digit, category, and item) is read into the adding ring and advances it from the preset stage as many stages as there are "count" cells stored in the drum for the particular digit. One complete revolution is required for this and the adding ring ends up on the stage corresponding to the sum of the keyboard digit and the stored digit. Of course, there may be a carry-over at this point and provision is made to save it for combination with the next digit. However, the digit in the adder must first be entered into the drum and this is done during the next drum revolution. As the next revolution progresses, nine index pulses for selecting the proper digit will appear in T71. These pulses are employed simultaneously to advance the adding ring and to write "no count" cells into the drum until the adder reaches the "9" stage. When the "9" stage is reached, the adding ring is not advanced further and the polarity of the writing pulses is changed so that "count" pulses are written into the drum for each of the remaining selected index pulses on T71. Thus if the given key entry is the digit 8 and a digit 5 is stored in the drum, the adding ring will be preset to 8, 5 reading pulses from the drum will then be put into the adding ring advancing it around to stage 3, and a digit of 1 will be carried over for the next ensuing digit. During the next revolution, however, the carried digit is held in abeyance while the digit 3 is written into the drum. This is done by writing "no count" cells into the drum for 6 index pulses on T71, and simultaneously advancing the adding ring one stage for each said pulse. Obviously, when a "no count" writing signal is made over a "count" cell on the drum, the result is to change the cell on the drum to a "no count" cell, and conversely for writing "count" cells, the writing signals override whatever condition exists in the cells. When the "9" stage is reached, thereafter "count" cells are written into the drum and since, in this hypothetical illustration, three index pulses remain, these "count" cells will be left in the data track for the particular digit.

(B) *Initial set-up for combining operation*

Stage *s*3 of the step counter causes relays R1 and R40 to be energized. Relay R1 is employed to direct the priming signals of the tubes of the digit ring from stage to stage thus putting previously by-passed stages *d*2, *d*4 and *d*6 into line in the digit ring. Relay R40 serves four purposes as follows:

(1) Contact R40–1 establishes a priming circuit on terminal T78 to the "carry one" counter (see Fig. 20, top for T78 and Fig. 16 for the "carry one" element).

(2) Contact R40–2 establishes a circuit through terminal T74 (Fig. 20 lower left) also to the "carry one" counter (Fig. 16).

(3) Contact R40–3 diverts the "print space" signal from *d*5 of the digit counter, and causes it to be used for printing the transaction symbol (Fig. 20 lower right).

(4) Contact R40–4 supplies power to terminal T93 (Fig. 20 upper left), which in turn conditions the preset system relays R35—R39 (see Fig. 21) to be energized by the category counter when appropriate.

(C) *Presetting "Carry One" counter*

At the twenty-fourth marker pulse, *d*7 initiates a further signal which after a fifty millisecond delay issues on terminal T76 (see Fig. 19 lower right) which serves to preset the carry-one counter to one of its stages designated herein for convenience as the "00" stage (see Fig. 16. Note: relays R16 and R17 are not energized in this illustration). The delay of the signal on T76 is for the purpose of providing sufficient time for relays to close where appropriate. Thereafter if a carry digit is to be stored, reference to Fig. 16 will show that a signal must be present in terminals T73, T74 and T75 concurrently. Such a condition will flip the carry-one counter to its other stage, designated herein as stage "10." The carry-one counter will then remain on stage "10" until a signal enters on terminals T76 or T77, whereupon it flips back to the "00" stage and simultaneously produces a pulse on T79 which is transmitted to the adder through one section of the read gate (see Fig. 18 upper right). This pulse on T79 must be delayed long enough to permit the adding ring to be preset to the next digit. The sequence of signals on these terminals will be discussed presently.

(D) *Twenty-fifth marker pulse*

(1) SPACE PRINTED

On the twenty-fifth marker pulse, stage *d*1 of the digit ring is fired energizing T87, and since relay R2 is energized by virtue of category stage *c*1 being on a space pulse emits on T87 (see Fig. 20, top line).

(2) ADDING RING PRESET

Also on the twenty-fifth marker pulse a signal passes from T87 to energize T43 which in turn passes through relay contact R39–1 and presets the adding ring to the keyboard digit for inventory category 4.

(3) READ GATE OPENED

A signal from stage *d*1 serves to energize T83 to open the read gate.

(4) CARRY GATE OPENED

A signal from stage *d*1 through T87 and relay contact

R40–2 also serves to open the carry gate by energizing terminal T74 (see Figs. 20 and 16).

(5) CARRY-ONE RESET PULSE

At the twenty-fifth marker, a reset pulse to the carry-one counter is keyed by the signal on T87 and issues through T77 to the carry-one counter. In this case the carry-one counter will already be on the "00" stage because the preset pulse on T76 discussed above put it there, and therefore no carry digit pulse is transmitted on terminal T79 at this time. However, if a pulse is to be transmitted on T79, it will be delayed three milliseconds.

(E) *Twenty-fifth drum revolution*

During the twenty-fifth drum revolution the read gate is open and "count" pulses pass from the drum to the adding ring on terminal T75. These pulses serve to advance the adding ring on stage each. When the adding ring reaches the "9" stage, terminal T73 is energized (see Fig. 17) and since the carry gate (T74) is open, the carry-one counter will flip to the "10" stage if another "count" pulse issues on T75. This will happen, of course, if the sum of the keyboard digit exceeds the sum of the stored digit.

(1) TWENTY-SIXTH MARKER PULSE

The twenty-sixth marker pulse advances the digit counter from stage *d1* to stage *d2*. Stage *d2*, and incidentally also stages *d4* and *d6* perform three functions. They prime the next stage in the digit ring, they open the writing gate by energizing terminal T84 (see Figs. 18 and 19) and they energize a stage of selection ring D to select the appropriate digit.

(2) TWENTY-SIXTH REVOLUTION

When the writing gate (T84) is opened and the pulses selected for the appropriate digit enter the writing gate through terminal T71, the writing gate emits pulses upward (see Fig. 18) to terminal T75 to advance the adding ring as long as the adding ring is not on stage "9." Also the writing gate passes "no count" signals through to the writing head which enters "no count" cells into the drum for each index T71 pulse until the adding ring reaches stage "9." When the adding ring reaches stage "9" (of course this may on the first index pulse on T71), then terminal T73 is energized and the writing gate is caused to shift from "no count" signals to "count" signals (see Fig. 18). Thereafter any remaining index pulses on T71 result in "count" pulses issuing to the data head from the writing gate. The shift in the writing gate caused by the signal on T73 also by-passes the actuating circuit for further pulses on T75 so the adding ring rests on stage "9" for the remainder of the index pulses on T71. (Incidentally, the read gate is not open on stages *d2*, *d4* and *d6*, so delayed index pulses on T72 have no effect here.)

(3) TWENTY-SEVENTH MARKER PULSE

The twenty-seventh marker pulse advances the digit ring from stage *d2* to stage *d3*. This has the following effects:

(*a*) It presets the adding ring through terminal T42. In this case the signal on T42 is channeled to T44 to preset the adding ring to zero because it will be remembered that the second digit is ignored here when dealing with inventory categories 3 and 4. For other categories, however, the ring is actually preset here to a keyboard entry digit.

(*b*) It opens the read gate through T83.

(*c*) It opens the carry gate through T74.

(*d*) It issues a reset pulse to the carry-one counter through T77. If the carry-one is then on stage "10," a carry pulse emits on T79 and passing through T75 advances the adding ring one digit. This makes no difference when dealing with categories 3 and 4 because the second digit is by-passed. (No index pulses issue from selection rings because relay R2 energized by stage *c1* of the category counter, breaks the circuit from *d3* to selection ring C.)

(4) TWENTY-SEVENTH REVOLUTION, TWENTY-EIGHTH MARKER PULSE AND TWENTY-EIGHTH REVOLUTION

Since no index pulses issue either on T71 or T72, the twenty-seventh and twenty-eighth revolutions pass without event other than advancing the digit ring from stage *d3* to *d4*.

(5) TWENTY-NINTH MARKER PULSE

The twenty-ninth marker pulse advances the digit ring to stage *d5*. This energizes T89 and the following things happen.

(*a*) Since relay R2 is still energized, a pulse from T89 gives rise to a normal space pulse (see Fig. 20), but since relay R40 is energized, this pulse is diverted to the transaction symbol line where relay R22 directs the pulse to terminal T4 and causes a digit "3" to be printed.

(*b*) The read gate is opened on T83.

(*c*) The carry-one gate is opened on T74.

(*d*) The carry reset line T77 is energized (T89 to T77, Fig. 20), and (*e*) The adding ring preset system is energized to place in the ring the keyboard digit for inventory category 3 (T89 to T41, Fig. 20, T41 through relay contact R39–2 to adding ring preset terminal as selected by key setting).

(*f*) Conditions selection ring C to issue index pulses for the proper digit (T89 to T62).

(6) TWENTY-NINTH REVOLUTION

During the twenty-ninth revolution, the adding ring is advanced from the preset stage by as many stages as there are "count" pulses in the data track for the given digit. At this point it is possible that the carry-one counter may retain a digit to be carried, but since there is only one digit to be stored for inventory category 3 such a carried digit must be ignored.

(7) THIRTIETH MARKER PULSE AND REVOLUTION

The thirtieth marker pulse advances the digit ring from stage *d5* to stage *d6*, and thereby energizes the writing gate T84, and the selection ring terminal T62. Thereafter, during the thirtieth revolution, the digit remaining in the adding ring is printed onto the data track as above described for category 4.

(8) THIRTY-FIRST MARKER PULSE

The thirty-first marker pulse drives the digit ring to stage *d7*. This has the following effects:

(*a*) It advances the category ring from stage *c1* to stage *c4*. This energizes T67 to selection ring D in order to select category 2, and also energizes relay R36 in the adding ring preset system.

(*b*) It causes a pulse to issue on T76 (see Fig. 19) this pulse is delayed 50 milliseconds in order to give relays R16 and R17 (not used in the "post order" transaction) time to energize. In this instance the carry-one counter is preset to stage "00."

(9) THIRTY-FIRST REVOLUTION

Since the reading and writing gates are not opened by *d7* and none of the terminals to the selection rings C and D are energized, the thirty-first revolution continues without event, except that the delayed signal on T76 presets the carry-one counter during the interval.

(10) THIRTY-SECOND MARKER PULSE

The thirty-second marker pulse returns the digit ring to stage *d1* which in turn opens the read gate (T87 to T83, Fig. 20), presets the adder to the appropriate stage corresponding to the third digit of category 2 on the keyboard (T84 to T43, Fig. 22, T43 to appropriate preset terminal through relay contact R36–1, Fig. 10), conditions selection ring C to read the third digit (T84 to T65, Fig. 19), opens the carry-one gate (T87 to T74 through contact R40–2, Fig. 20, see also Fig. 16), and energizes the carry-one reset line (T87 to T77, see Fig. 20), but since in this instance the carry-one counter is already at stage "00," no carry signal issues on T79.

(11) THIRTY-SECOND REVOLUTION TO THIRTY-EIGHTH MARKER PULSE

During the thirty-second revolution, the adding ring is advanced as many stages as there are "count" cells in the data track for the digit selected. The thirty-second marker pulse advances the digit ring to stage *d*2 and the digit remaining in the adding ring is written into the drum during the ensuing revolution as previously described. On the thirty-fourth marker pulse, the adding ring is preset to the second digit of the category and the carry-one counter receives a reset pulse on T77. If, during the thirty-second revolution, the carry-one counter was turned to stage "10" as a result of the adding ring going over the "9" stage, the reset signal on T77 flips the carry-one counter back to stage "00" and causes a carry signal to pass out terminal T79. Since the reset signal on T77 is concurrent with the adding ring preset signal (T88 to T42 to carry preset through relay contact R36–2, see Figs. 22 and 10), some provision must be made to distinguish these signal to the adding ring. This is done by delaying the signal on T79 (see Fig. 16) so that the adding ring is first preset to the keyboard digit and then the carry-one signal enters (T79 to T75, see Fig. 18) and advances the adding ring one stage. From the thirty-fourth revolution to the thirty-seventh marker pulse the digit ring advances in sequence from stage to stage each time combining the data on the track with the keyboard data as will now be understood.

(12) THIRTY-EIGHTH TO FORTY-FIFTH MARKER PULSE

The thirty-eighth marker pulse advances the digit ring to stage *d*7 which in turn advances the category ring to stage *c*5. The result of this is to condition the circuits for the combining operation for the keyboard entry for inventory category 1 (post order) and the stored data for that category. After this, the digit ring is recycled by ensuing marker pulses as the category 1 digits are combined.

(F) *Fourth Phase: reading the "status" balance (marker pulses forty-six to fifty-seven)*

At the forty-fifth marker pulse, digit ring stage *d7* is again energized. This brings the category ring back to *c*1 and causes a signal to emit on T94 to the step counter, advancing the step counter to stage *s*4. At this point the object is to read and print "status" again from the drum, but this time the combined totals will appear. Thus, stage *s*4 of the step counter merely primes stage *s*5 thereof, and since no other special relays are now energized, the reading "status" operation commences on the forty-sixth marker pulse with the category ring at stage *c*1 and the digit ring at stage *d*1. This operation continues until the fifty-seventh marker pulse whereupon the stage *d*7 of the digit ring and the *c*1 stage of the category ring are again fired.

(G) *Fifth Phase: printing item index number*

At the fifty-seventh marker pulse the step counter is advanced from stage *s*4 to stage *s*5, relay R3 is energized and the sequence of printing the item index number previously described takes place and continues through the sixty-third marker pulse which advances the position counter to stage *p*4 where the apparatus remains until another transaction is undertaken.

The entire "post order" transaction takes about six seconds during which the printer operates for a total of about four seconds with a two second gap in the middle while the combining phase takes place.

XI. "POST ORDER"—REVERSE ENTRY

The next operation to be discussed is that of reversing an entry. This is used for subtracting from certain categories when desired, and also is used for correcting mistakes in entries. For instance, in the hypothetical example described above for "post order," an entry of 95 additional units was placed "on order." If it is now discovered that this order was mistakenly entered or for any other reason it is desired to be withdrawn, some provision must be made for taking an entry out and restoring the apparatus to the same condition in which it was before the entry. This is done by making the same key entries exactly as were made for the previous entry and in addition the "reverse entry" key of the transaction key columns is depressed.

With reference to Fig. 11*a* it will be seen that the "reverse entry" key energizes relays R17 and R27. These relays have the following functions.

(A) Relay R17 contact 1 (Fig. 11*a* top) closes part of a circuit to relays R28, R29, and R30. These latter relays are used for presetting the adding ring to the "9's" complement of various digits as will be explained below. It should be noted that relays R28, R29 and R30 are not actually energized until relay R1 contact R1–4 is closed, and as was previously described this occurs when the step counter advances to stage *S*3. Contacts R17–2 and R17–3 may be seen in Fig. 16 and they serve the purpose of establishing a carry preset circuit (T76) to preset the carry counter to stage "10" whenever relay R16 is not energized. Relay R16 will be further discussed below.

(B) Relay R27 contacts R27–2, R27–3 and R27–4 (see Fig. 20 lower right) are used for shifting the transaction symbols from terminals T2, T3 and T4 to terminals T6, T7 and T8. Thus whenever the "reverse entry" key is depressed, a transaction symbol is printed corresponding to the basic transaction symbol but with a numerical value of four added thereto. The reverse entry transaction symbol for "post order" is "7."

It will be understood, of course, that in addition to the circuits established by the "reverse entry" key, the "post order" circuits described in the preceding section are also established.

(1) FIRST PHASE: READING "STATUS"

After the operation commences, the "status" categories are read and printed during the first twelve marker pulses as in the "post order" operation.

(2) SECOND PHASE: READ AND PRINTING KEYBOARD DATA

During the second phase the keyboard data is read exactly as in the second phase of the "post order" operation.

(3) THIRD PHASE: SUBTRACTING ENTRY DATA FROM STORED DATA AND WRITING RESULTS INTO DRUM

The third phase of the reverse entry procedure is the one which differs from the normal "post order" transaction, and instead of adding the keyboard data to the stored data, the keyboard data is subtracted therefrom. In general the subtraction is accomplished by first presetting the adding ring to the "9's" complement of a given keyboard digit and then advancing the ring to the "10's" complement position for the first digit. Thereafter the digit on the drum is read into the adding ring and advances the same in accordance with the number of "count" pulses stored. The resultant digit in the adding ring will be equivalent to the keyboard digit subtracted from the stored digit. For a simple illustration, let us assume that a three digit category has the following digits stored therein, 009, and it is desired to subtract 3 units therefrom. The keyboard entry therefor will be 003 (assuming the other appropriate keys have been depressed including the "reverse entry" key). During the subtraction operation, the adding ring will first be preset to the "9's" complement of 3 which will be at the "6" stage. Prior to this time the carry counter will be set to stage "10" or the "carry-one" stage. On the marker pulse which presets the adding ring, the carry counter will also be flipped back to the "00" stage, and a carry signal (delayed three milliseconds) will be entered into the adding ring and will advance the same from the "6" to the "7" stage. Thus the adding ring for the units order digit only will be on the stage corresponding to the "10's" complement of the keyboard entry 3. Thereafter the digit stored in the drum ((corresponding to the third digit units order of the category) will be entered in the adding ring. In the example under present discussion, we assume that the third stored digit was "9" and therefore the adding ring will be advanced "9" stages and be carried over to the "6" stage which will advance the carry counter to stage "10." Thereafter the digit "6" is written into the data track from the adding ring as was previously explained. Continuing with the subtraction phase for the remaining digits, the next step is to preset the adding ring to the 9's complement of "0" (the second digit of our selected illustration). This 9's complement obviously presets the adding ring to the "9" stage. It will be remembered that the carry counter has one stored digit therein and therefore when it is actuated by the digit counter (stage *d*3), the adding ring is advanced over to the "0" stage. Thereafter reading from the drum contributes nothing since the digit stored therein is "0" (meaning no "count" cells), but a carry-over digit remains in the carry counter. Continuing the subtraction operation through to the first digit is done in the same manner and the drum ends up with stored digits 006. Actually the subtraction ends up with a "carry" digit remaining in the carry counter, but it may be ignored for the purposes of the present discussion.

(C) *Initial set up for reverse entry combining operation*

The same circuits are established in this operation as for the previously discussed "post order" operation with the exception of the circuits established by relays R17 and R27 from the "reverse entry" key. Relay R17 has the effect of diverting the preset signals from the digit ring to the adding ring (via terminals T43, T42 and T41) from the terminals corresponding to the actual digit, to terminals corresponding to the "9's" complement of the digit (see relays R28, R29, R30, Fig. 10). Relay R17 conditions the carry counter so that when the preset signal comes in on terminal T76 (see Fig. 16) the preset signal flips the carry counter to stage "10" and sends a carry signal to the adder (after three milliseconds delay).

It will be seen, therefore, without rehearsing the steps of subtraction in detail that, as the phase continues through the twenty-fourth marker pulse to the forty-fifth marker pulse, the apparatus will function in exactly the same manner as for "post order" except the key entries will be subtracted from the drum instead of added thereto:

(D) *Fourth Phase: reading the "status" balance*

This is done exactly as in previously described fourth phase of "post order."

(E) *Fifth Phase: printing item index number*

This is done exactly as was previously described for the fifth phase of "post order."

XII. "TRANSFER"

The next operation to be discussed is that of transferring stock from one status category to another. For instance, if items are taken from the warehouse (inventory category 2) and transferred to the sales floor (inventory category 3) the apparatus must be adapted to make the entries. In the embodiment described herein, this is done in two operations. First the units are subtracted from the warehouse category and then they are added to the "sales floor" category.

The procedures and circuits for the transfer operation have already been discussed in connection with "post order" and "post order reverse entry." It will be remembered that under "post order" the keyboard entries only concerned category 1 ("on order"), and the keys for the other "status" categories were set at zero. However, in that operation, from the twenty-fifth marker pulse to the thirty-eighth marker pulse, additions could have been made consecutively in categories 4, 3 and 2, and under "reverse entry" conditions, subtractions could have been made. Thus, when making a transfer from "warehouse" to "sales floor," a "reverse entry" is carried out first for inventory category 2, this subtracts the items from that category. Thereafter the transfer operation (key No. 3, "post order or transfer") is carried out to add the items to inventory category 3. Transfers from and to other status categories may be made in a similar manner except the "on order" category presents special problems to be discussed under the next heading.

XIII. RECEIVE

The operation of recording items received adds a new refinement. In this operation, the number of items received must be entered in the "status" categories in accordance with the allocation of the items in the store, the "on order" category must be reduced by the number of items received, and the "period receipts" category must be increased accordingly.

(A) *Relay R6*

This is done principally by relay R6 which is operated by transaction key "2" ("Receive") and serves to establish circuits for changing the third phase of the previously discussed "post order" operation to meet the new requirements. In general terms, this change is essentially as follows:

(1) The category ring is conditioned to deal consecutively with inventory categories 4, 3, 5, 2 and 1 (category ring stages *c*1, *c*3, *c*4 and *c*5). This is done by relay R5 (contact R5–1) which is energized only during this phase through relay contact R6–2 (see Fig. 11), it being understood that relay R1 is energized by step counter stage *s*3 at the start of this third phase.

(2) Through relay contact R6–1, part of the output of category ring stage *c*5 is employed to energize relay R16 which in turn changes the operation from addition to subtraction for inventory category 1. Relay R16 does this by energizing relays R28, R29 and R30 (see Fig. 11*a*), the 9's complement relays, and also by conditioning the carry counter to function as previously described for subtraction.

(B) *Keyboard Entries*

The keyboard entries for the "receive" transaction are made as follows:

(1) Item index number as usual.

(2) The total number of units received is entered in the keyboard bank for categories 1 and 5 (see Fig. 2). These keyboard entries are employed both for adding to "period receipts" (category 5) and for subtracting from "on order" (category 1). This is done by employing the output of both category ring stage *c*3 and stage *c*5 to energize relay R35 (see Fig. 21), and by subtracting while on category stage *c*5. (Function of contact R6–1 discussed in preceding paragraph applies.)

(3) The number of units allocated to "warehouse," "sales floor" and "repair shop" are entered in the remaining groups of key columns as appropriate.

(C) *Operation*

In operation, this transaction is the same as "post order" in all phases except the third, that is, during the first and second phases, the status categories on the drum are read, and the keyboard entries are printed consecutively. During the fourth and fifth phases, the balances for the status categories and the item index numbers are read and printed consecutively. During the third phase, the transaction symbol, in this case "2," is printed, and the combining operations take place. The entries in inventory categories 4 and 3 are then added to the appropriate places in the data track (category ring stage *c*1). Then the entry in inventory category 5 ("period receipts") is added to the data track (category ring stage *c*), after which the entry in inventory category 2 ("warehouse") is added to the data track (category ring stage *c*4). Finally, when the category ring reaches stage *c*5, relay R16 is energized, and the entry for inventory category 1 (in this case, the same keys as for inventory category 5) is subtracted from the data track.

XIV. "RECEIVE-REVERSE ENTRY"

If items are received and entered as such, but thereafter they are returned to the manufacturer, the transaction is handled simply by employing both the "receive" key and the "reverse entry" key together. This operation need not be discussed elaborately because it will be understood now that the "reverse entry" key simply inverts the sign of the entries. With reference to Fig. 11*a*, it will be seen that the "reverse entry" key energizes relay R17 of which contacts R17–1 energizes the 9's complement relays R28, R29 and R30 for the subtraction operation. Relay R17 also conditions the carry counter appropriately (see Fig. 16). Thus, subtraction continues throughout the operation wherever addition occurred in the "receive" operation, and where subtraction occurred in the "receive" operation with relay R16 energized, contacts R16–1 and R16–2 nullify the effects of relay R17 such that during phase three of this operation the transaction symbol "6" is printed instead of symbol "2." This is accomplished by relay R27, energized by the "reverse entry" key (see Figs. 11*a* and 20), and the circuits perform the adding function.

The end result of the "receive-reverse entry" operation is to reduce the amounts on hand in categories 4, 3 and 2, to reduce the "period receipts" category, and to increase the "on order" category.

It should be noted here that the printed line for both this operation and the simple "receive" operation omits the "period receipts" category. If it is desired to read this category, a separate "read activity" operation must be carried out.

XV. "SALE"

Recording a sale transaction presents a new problem because sales may be made from the warehouse, from the sales floor or from the repair shop directly to the customer, and it will be desirable automatically to enter any or all of such sales in the "period sales" category. The operation, therefore, enters subtractions from categories 4, 3, and 2 and additions to category 6 following each such subtraction. This operation is controlled principally by relay R8. Relay R8 does not actually take effect until the third phase of the operation since, as in the other "transact" operations, the first phase entails reading and printing "status," and the second phase entails printing the keyboard entries. In the third phase relay contact R8–2 energizes relay R16 when the category ring is on stage *c*1 (see Fig. 21), thereby effecting a subtraction of the keyboard entries from inventory categories 4 and 3 consecutively. During the third phase, since relays R1 and R40 are also energized from step counter stage *s*3 (see Fig. 22), relay contact R8–4 (see Fig. 11*a*) energizes relay R7. Relay contact R7–4 causes the category ring to advance to stage *c*2. At stage *c*2, relay R16 is not energized so an adding operation will ensue. Also at stage *c*2, by relay contact R7–2, inventory category 6 is selected (see terminal T70, Fig. 21), and inventory category 4 is added thereto by operation of relay contact R38–1 (see Fig. 10) off of category ring stage *c*2. At stage *c*3, inventory category 6 (terminal T70) is again selected, and this time inventory category 3 is added thereto by operation of relay R37 through contact R8–3 (see Fig. 10 and Fig. 21). At stage *c*4, inventory category 2 (terminal T67) is selected and relay R16 is again energized for subtraction. Relay R36 is also energized and the sales entry on the keyboard for this category is then subtracted from the stored quantities. Finally at stage *c*5 on the category ring, relay R16 goes off, inventory category 6 is again selected (T70 through relay contact R7–3, see Fig. 21), and the keyboard entry for inventory category 2 is added to period sales, relay R36 again being energized through contact R7–1 (see Fig. 21).

The "sale" transaction is completed as usual with phases four and five takening care of printing the balances only in the "status" categories and the item index numbers. A transaction symbol "1" is printed during phase three, this time being controlled by relay R20 from the "sale" key (see Figs. 11*a* and 20).

XVI. "SALE-REVERSE ENTRY"

If a customer returns an article, or an operator makes an erroneous "sale" entry, the change may be recorded by a "sale-reverse entry" transaction. The operation of this transaction need not be discussed in detail now because the operation of relays R17 and R27 of the "reverse entry" key have been fully explained previously and their effect in this operation is the same. They apply to phase three, the combining phase, and simply invert the sign of the transaction.

XVII. "CLEAR STATUS"

The status categories of an item may be "cleared" or reduced to zero "count" digits by operation of the "clear" status key together with the "transact" key. This operation is directed basically by relay R15, energized by the "clear status" key (see Fig. 11*a*). Phase one of this operation is the usual "read status" operation, after which, the step counter by-passes stages *s*2 and *s*3, and goes directly to stage *s*4 by operation of relay contact R15–1 (see Fig. 22). The output of stage *s*4, through relay contact R15–2 energizes relay R11, and this latter relay serves to establish the circuits for changing all "count" cells on the drum in the status categories to "no count" cells. Reference to Fig. 20 shows that contact R11–1 breaks the read gate circuit (T83) and establishes the write gate circuit (T84), and contact R11–2 breaks the print circuit (T81, Fig. 20). Thereafter, as the digit and category rings cycle through, the adding ring is continually reset to the "zero" stage on T44 as in reading "status" from the drum, and 9 "no count" writing pulses are sent to the writing head. The result is obviously to leave each status digit without "count" cells.

This operation may be continued for all items by concurrent operation of the "list" key.

XVIII. CLEAR ACTIVITY

Clearing the "activity" categories requires no elaboration at this point because it simply entails use of the "clear activity" key which energizes both relay R4 and relay R15. Relay R4 serves to shift selection over to the "activity" categories and from there on the operation follows the same order as "clear status." The list function may likewise be employed in conjunction with "clear activity."

XIX. LIST REORDER

The embodiment of our device described in the foregoing sections is adapted primarily for handling inventory problems without automatically supplying reorder information. In other words, with the arrangement already described, in order to determine which items should be reordered, the buyers for the store will have to run the register through a complete operation of "List Status" described above, then inspect the quantities on hand for each item of inventory, and finally determine from previously determined buying curves which items require reordering.

Our apparatus can be adapted to provide reorder information automatically and thereby avoid the lengthy process hitherto employed. It can be done in the general arrangement of our device in a number of different ways, one of which will now be described.

Essentially the problem is one of providing a category for storing digits representing the reorder level of a given item (number of units of a given item below which the item should be reordered), then comparing the reorder level to the number of units actually on hand for the given item, and finally, if the number on hand falls below the reorder level, printing out the pertinent inventory information for that item so that when the operation is completed there will be a list containing only the items requiring reorder and the amounts on hand together with the period sales activity for those items.

In accomplishing this with our device, certain changes and adaptations of the arrangement previously described will be necessary. Perhaps the best way to introduce these changes and adaptations will be to explain first the general operation of the equipment in this instance. Then, when the functions are understood, the details and changes in the circuits will be more meaningful.

In order to handle the reorder problem in the context of the arrangement described, we provide a three digit category for storing the reorder level for each item. For convenience we have taken inventory category 5 for this purpose, on the assumption that "period receipts" information may be more readily dispensed with. In other words the former "period receipts" category now becomes the "reorder level" category. Of course, larger storage capacity so that both categories can be used may be provided without departing from the spirit of this invention. We have substituted "period receipts" for "reorder level" in this illustrative example only for convenience of explanation. The reorder level information now assumed to be stored in category 5 is to be compared with the categories containing information as to quantities of stock on hand, and again for convenience of illustration we have selected category 2 and will regard it henceforth as containing the total stock on hand for a given item. Categories 3 and 4, of course, might be included herein but to use them requires additional circuitry and complicates the explanation without material contribution to an understanding of the essential operation. However, it will be understood that these latter two categories may be included with further adaptation of the circuits, if desired.

Thus the function of the "list reorder" operation as described herein will be essentially to compare categories 2 and 5 and if the quantity on hand represented by category 2 for a given item is less than the reorder level in category 5 for the given item, then the machine will print out the inventory information for that particular item and thereafter index to the next item. However, if the quantity on hand is greater than the reorder level, the machine will not print out anything but will simply index directly over to the next item. The comparison between categories 2 and 5 is accomplished by adding the 9's complement plus 1 of the reorder level to the number of units on hand. This results in subtracting category5 from category 2 and by simple mathematics, when a "carry-one" exists after the subtraction, we know that the value in category 2 is greater than that of category 5. The carry-one counter previously described (see Fig. 16) is employed to detect the presence or absence of the "carry-one" after the comparison and also serves to control the subsequent operation of the machine after the subtraction, as will be explained in detail below.

It will be remembered that "reading from the drum" as previously described results in passing to the adding ring only pulses corresponding to reversely polarized or "count" cells. In order not to disturb this arrangement in the reorder adaptation herein described, we simply enter the 9's complement of the reorder level into the drum in the form of "count" cells, and thereafter the subtraction may be accomplished merely by reading both categories directly from the drum and summing them. As will be explained more in detail, we do the combining in this instance simultaneously during the same revolution.

(A) *Key settings*

Turning now to the details of the "list reorder" operation, the initial keyboard set-up includes depressing the "zero" item index keys, the "list reorder" key, and "read" key. Since the functions of the "read" and item index keys will be understood by now, the functions of the "list reorder" key only will be described in detail.

(B) *List reorder key*

As may be seen in Fig. 11*a*, the "list reorder" key energizes relays R10, R18, R19, R45 and R100. Relays R10, R18 and R19 give rise to the listing operation described above whereby the item index selection is advanced from item to item after completion of each operation. Relay R45 conditions the category ring to "read all" as was previously described. Thus, in the "list reorder" operation the printed line for items to be reordered contains all of the stored inventory information.

(C) *Relay 100*

Relay R100 is the basic relay for the "list reorder" operation, and when energized, it establishes the circuits for carrying out the comparison between inventory categories 2 and 5.

Essentially relay R100 has three functions. First, it channels the pulse in T85 away from stage *s*1 of the step counter to stage *s*0 (see contact R100–1, Fig. 22). Secondly, it further channels the pulse in T85 away from stage *c*1 of the category ring to stage *c*0 (see contact R100–3, Fig. 21). And thirdly, it closes a circuit from T85 to the carry-one counter (see R100–2, Fig. 16) whereby the carry-one counter is conditioned to produce a "carry-one" pulse for each pulse on T85.

(D) *Stage s0*

Stage *s*0 of the step counter is all important in this operation because it energizes another relay, namely, R101, and it also conditions selection ring D to select inventory category 2 (T67) and inventory category 5 (T69) simultaneously.

(E) *Stage c0*

Stage *c*0 has only one function, it turns off all other tubes in the category ring so that while *s*0 remains on, the category ring cannot function.

(F) *Relay R101*

Relay R101 has a number of functions. First, it energizes relay R40 (see contact R101–1, Fig. 11*a*). Relay R40, as was previously described, energizes the "carry-one" counter. This is illustrated in Fig. 20 where it will be seen that contact R40–1 provides a source of power to terminals T77 and T78, which go to the carry-one counter, and contact R40–2 provide a source of power to terminals T74 which also goes to the carry-one counter (see Fig. 16). Secondly, relay R101 closes a circuit from stage *d7* of the digit ring in terminals T90 to the carry-one counter (see contact R101–2, Fig. 16). And thirdly, relay R101 opens the circuit to the carriage return (see contact R101–3, Fig. 11*a*) so that while stage *s*0 is on the carriage return will not operate.

(G) *List reorder operation*

(1) FIRST MARKER PULSE

The operation of the machine with the circuits thus established is as follows.

On the first marker pulse in terminal T59 after the "read" key has been closed, stage *p*1 of the position counter will be fired, which in turn will energize terminals T85 and T86. This in turn fires stage *d*1 of the digit ring, stage *d*0 of the category ring, and stage *s*0 of the step ring (see Figs. 19, 21 and 22). The manner in which these three stages condition the circuits for the ensuing operation will now be discussed in order.

(2) STAGE *d*1

Stage *d*1 energizes terminal T87 and therefore, with reference to Fig. 20, it will be seen that a pulse will issue on terminal T77. This pulse on T77 serves to reset the carry-one counter to stage 00. Stage *d*1 also serves to reset the adding ring to "zero" by operation of a pulse passing through terminal T87 to terminal T43 (see Fig. 22), and thence to terminal T44 (see Fig. 10). The signal from stage *d*1 in terminal T87 also serves to open the "read gate" T83 and the "carry gate" T74 (see Fig. 20). Finally the signal in T87 from stage *d*1 of the digit ring serves to energize terminal T64 for the selection of the third digit.

(3) STAGE *c*0

As was explained above, stage *c*0 serves the sole function of turning off all the other tubes in the category ring.

(4) STAGE *s*0

Stage *s*0 serves the primary function of energizing terminals T67 and T69 simultaneously, and also serves to energize relay R101, the functions of which have been described above.

(5) FIRST REVOLUTION

The sequence of events following the first marker pulse is as follows. First, after the circuits are established by the relays and stages described, the adding ring is reset to "zero" by the pulse originating in stage *d*1 and entering the adding ring through terminal T44. Three milliseconds later, the carry-one counter, having received a pulse through terminal T77, generates a delayed pulse in terminal T79 which advances the adding ring to the "1" stage. Thus the operation will thereafter commence with one "carry" digit already present in the adding ring. Thereafter, since the "read gate" is opened (T83), count pulses will commence to enter the adding ring from the drum. It will be noted in this illustration that terminals T67 and T69 to selection ring D are simultaneously energized, and therefore these two categories will both be read during the same revolution. This is permissible with the arrangement described because it will be noted that the pulses will be sufficiently spaced to remain within the limiting frequency of the adding ring which is approximately 2000 c.p.s.

Since the count pulses stored in category 5 (corresponding to terminal T69) represent the 9's complement of the reorder level, it will be seen that combining them in this manner will result in a subtraction of inventory category 5 from inventory category 2. If the third digit of category 2 is larger than the third digit of category 5, the combination of these two items will cause the adding ring to carry over from the 9's stage and when the first revolution is completed the "carry-one" counter will be left on the "10" stage.

(6) SECOND MARKER PULSE AND REVOLUTION

On the second marker pulse the digit ring will be advanced from stage *d*1 to stage *d*3. Stage *d*3 accomplishes the following things. First, it resets the adding ring to "zero" (T88 to T42 to T44). Secondly, it resets the carry-one counter to stage "00" (T88 to T77, see Fig. 20), and in resetting the carry-one counter to the "00" stage, if a digit is to be carried, a signal will be delivered to terminal T79 after three milliseconds delay. Thirdly, stage *d*3 opens the "read gate" (T88 to T83, Fig. 20) and also opens the "carry gate" (T87 to T74, Fig. 20). And fourthly, stage *d*3 energizes terminal T63 for selection of the second digit for comparison.

Thus during the revolution following the second marker pulse, the adding ring will collect the second digit of category 2 together with the 9's complement of the second digit of category 5. Here again, if the digit contained in category 2 (plus the carry-one if present) is greater than the reorder level digit, the carry-one counter will be advanced to stage "10" by the end of the revolution.

(7) THIRD MARKER PULSE AND REVOLUTION

On the third marker pulse the digit ring advances to stage *d*5 where circuits similar to the circuits of stage *d*3 are established except in this instance terminal T62 to the selection ring C is energized instead of terminal T63. This causes the first digit of categories 2 and 5 to be compared.

(8) FOURTH MARKER PULSE

If the carry-one counter has been advanced to the "10" stage at the end of the third revolution, then it will be known that the quantity on hand represented by category 2 has not fallen below the reorder level stored in category 5, and there will be no need to print out any inventory information as to the item just compared. Therefore, on the fourth marker pulse when stage "10" of the carry-one counter is energized, we have adapted the apparatus immediately to pass to the indexing operation so that nothing will be printed.

(9) OMISSION OF PRINTING WHEN "CARRY COUNTER" ON STAGE "10"

On the fourth marker pulse it will be seen that the digit ring advances from stage *d*5 to stage *d*7, and furthermore, that stage *d*7 causes terminal T90 to be energized. Since relay contact R101–2 is closed (see Fig. 16), the pulse in terminal T90 causes either one or the other of the tubes in the lower right-hand corner of Fig. 16 to be fired, and which one of these tubes is fired will be determined by the status of the carry-one counter. If the carry-one counter is on stage "10," then the tube energizing terminal T100 will be primed and will fire following the fourth marker pulse when T90 is energized. The effect of energizing terminal T100 is to fire stage *p*3 of the position counter (see Fig. 22). This in turn extinguishes stage *p*1 of the position counter, which in turn freezes the digit counter on stage *d*7 by taking the energy off terminal T86.

Stage *p*3 of the position counter energizes relay R13 as was previously explained, which together with relays R10, R18 and R19 causes the index stepping switches to advance one unit (see Figs. 9 and 11*a*). The carriage return is not actuated at this time because the circuit to it is broken by relay contact R101–3 (see Fig. 11*a*). Therefore during the revolution following the fourth marker pulse the index selection mechanism will be advancing one item. On the fifth marker pulse the position counter will be advanced to stage *p*4 and since relay contact R10–1 is closed in this operation, stage *p*1 will then be primed again provided relay contact R42–1 is closed, and *p*1 will be fired on the next ensuing marker pulse. In other words the fourth and fifth revolutions are employed in this instance in order to provide sufficient time for the item index system to come to the next item number, and a further precaution is added by the hold-off relay R42 so that the next comparison actually cannot commence until the data head comes to rest and relay R42 becomes energized.

(10) "READ ALL" OPERATION IF CARRY COUNTER IS ON STAGE "00"

On the other hand, if the carry-one counter is on stage "00" indicating that the quantity on hand is less than the reorder level, then when terminal T90 is energized by stage *d*7, terminal T101 will be energized instead of terminal T100 (see Fig. 16). The effect of this will be to advance the category ring from stage *c*0 to stage *c*1 (see Fig. 21) and also to advance the step counter from stage *s*0 to stage *s*1. At this point it will be seen that the previously described "read all" operation will then commence and will be carried through to its completion. In other words when no carry digits are present in the carry counter, it will be an indication that the quantity of units on hand will be less than the reorder level for that item and the inventory information for that item should be printed out.

This is accomplished in essentially the same manner as was described above for the "read all" operation, since relay R45 is energized the category counter will index from stage to stage and each of the various categories will be read in order. The only difference between the "read all" operation in this instance and that previously described relates to reading the reorder level from the drum. It will be remembered that the count pulses stored in the drum as to inventory category 5 actually represent the 9's complement of the reorder level, and therefore they must be reversed prior to printing them out. This is done by means of relay R50 (see upper right-hand corner, Fig. 17) which is energized through terminal T69_a_ (used only in this adaptation) when stage _c_2 of the category counter comes on. Relay R50 is a multiple bank relay and serves the purpose of causing the adding ring to prime the 9's complement in the printer instead of the digit directly corresponding to the digit in the adding ring. Terminals T1_a_ to T10_a_ are used for this purpose and may be traced in the central portion of Fig. 17. Thus when it comes to printing out category 5 as selected by terminal T69 (see Fig. 21), the digits printed correspond directly to the reorder level.

XX. ENTER REORDER LEVEL

Entering the reorder level may be done in the context of this adaptation of our circuits by an operation which takes only category 5 and simply enters into the drum the keyboard entry for the recorder level.

(A) *General sequence*

The general sequence of phases in this operation is as follows: first, the reorder level previously stored on the drum is read and printed; second, the keyboard entry is printed; third, the keyboard entry is entered into the drum; fourth, the new entry is read from the drum; and fifth, the item index number is printed.

(B) *Key settings*

To accomplish this the "item index," the "enter reorder level" and the "transact" keys are depressed in that order. The "enter reorder level" key energizes relays R4 and R102 (see Fig. 11_a_).

(C) *Relay R4*

Relay R4 causes the category ring to step from stages _c_1 to _c_5 and effects a selection of inventory categories 6 and 5 (T70 and T69) in that order (see Fig. 21).

(D) *Relay R102*

Relay R102 establishes circuits which cause relay R103 to be energized whenever stage _c_1 of the category ring is on (see contact R102–1, Fig. 21), and cause relay R104 to be energized instead of relay R1 when stage s3 of the step counter is on (see contact R102–2, Fig. 22).

(E) *Relay R103*

Relay R103 is energized whenever stage _c_1 is on and serves the sole purpose of opening up the signal leads from stages _d_1, _d_3 and _d_5 of the digit ring (see contacts R103–1, R103–2 and R103–3, Fig. 19). Thus the digit ring does not open either the "read" gate or the "write" gate when stage _c_1 is on and no printing takes place with regard to inventory category 6 (period sales). The digit ring merely cycles through without other effect in this instance. It will be understood that further adaptation of the circuits may be employed to omit this extra cycle for the digit ring but such would require more extensive rearrangement of the circuits than herein described and is not necessary for an understanding of this aspect of the invention.

(F) *Relay R104*

Relay R104 is energized only during the third phase of the "enter reorder level" operation, that is, only when stage _s_3 of the step counter is on. It accomplishes two things, first, it takes the B+ voltage from the print circuits and supplies it to terminal T93 (see contact R104–1, Fig. 20). This means that no print pulses will issue to the printer and that the preset system from the keys to the adding ring will be energized. Secondly, relay R104 causes the signals in T87, T88 and T89 to energize the "write" gate (T84) instead of the "read" gate (T83) (see contact R104–2, Fig. 20 lower left).

(G) *Operation*

(1) FIRST PHASE

With these relays and circuits conditioned to function, it will be seen that the first phase of the operation, when stage _s_1 of the step counter is on, will be practically the same as "read activity" described above, except that inventory category 6 will not be read because of relay R103 which is energized by stage _c_1 of the category ring. After the digit ring cycles through once, the category ring advances directly to stage _c_5 (by operation of relay R4), and since terminal T69_a_ will then be energized (also by operation of relay R4), relay R50 will be energized. Thus when the 9's complement of the reorder level is read from the drum to the adding ring the normal digit for the reorder level is printed.

(2) SECOND PHASE

The second phase of the operation commences when stage _s_2 of the step counter is fired. Relay R9 is energized at this time and the previously described preset system from the keys to the adding ring comes into play. Since relay R103 is energized on stage _c_1 nothing is printed until the category ring again advances to stage _c_5. At that time, since relay R50 is again energized and also relays R28, R29 and R30 (see contact R50_a_, Fig. 11_a_), the adding ring will be preset to the 9's complement of keyboard entry for the reorder level, but the printer will print out the actual keyboard entry.

(3) THIRD PHASE

The third phase of the operation commences when the category ring again recycles to stage _c_1 and advances the step counter to stage _s_3. At that time, relay R104 comes into play disconnecting the power to the print system, energizing the adder preset system, and preparing the write gate (T84) to be opened when stage _c_5 is on. As this phase progresses, the digit ring first cycles through without effect when stage _c_1 is on and then, when stage _c_5 is on, the 9's complement of the keyboard entry for the reorder level is preset into the adding ring and then entered into the drum. To briefly rehearse the details of this entry operation, it will be seen that when stages _d_1 and _c_5 are on concurrently, selection terminals T64 and T69 will be energized, thus selecting the third digit of the reorder level. Since _d_1 is on, and relay R103 is now de-energized, a pulse will issue on terminal T87 which passes to terminal T43 (see Fig. 22), thence through the keyboard system (Fig. 10), relay R35 being energized (see Fig. 21), and finally through the 9's complement relays (R28, R29, and R30) to the adding ring to preset it at the 9's complement of the third digit of the reorder level. Thereafter, during the ensuing drum revolution, since the write gate is now open (see T84, Fig. 20, lower left) the said 9's complement will be printed into the drum overriding any digit previously stored for that digit. The same sequence is repeated for the other two digits as the digit ring cycles from _d_1 to _d_3 to _d_5 except that the other digit selection terminals (T63 and T62) will be respectively energized.

(4) FOURTH PHASE

The fourth phase of the operation commences when stage _s_4 of the step counter is fired and consists usually in a repetition of the first phase. In other words the reorder level remaining stored in the drum is read out and printed.

(5) FIFTH PHASE

Lastly, the fifth phase results in printing the item index number as was previously described.

XXI. VARIATIONS OF PREFERRED EMBODIMENT

Numerous minor variations of this preferred embodiment will now become apparent to those skilled in the art. For instance in the reorder adaptation it will be entirely possible to enter the actual digits of the reorder level into the drum instead of the 9's complement thereof. To do this will simplify the reading and writing operations but will require the provision of means for reading the "no count" cells from the drum instead of the "count" cells when comparing stock on hand with the reorder level. Such can be done by issuing pulses to the adding ring through terminal T75 when the data pulses are out of phase with the basic match pulses instead of when they are in phase.

A number of variations of this preferred embodiment of our invention will, of course, be dictated by the particular needs or desires of the ultimate users. For instance, an ultimate user may prefer to compile a list each day of items in which sales have occurred during that day. Such a list will be extremely helpful to the buyers and could well replace the list reorder operation described above in section XX. A number of ways to accomplish this in our device suggest themselves. For instance, it may be done by a simple adaptation of the list reorder operation by entering the 9's complement of zero into inventory category 5 and then adding it to the period sales category in essentially the same manner as was done for "List reorder." With reference to Fig. 22 it will be seen that this may be done by substituting terminal T70 for terminal T67 (upper right-hand corner of Fig. 22) so that inventory categories 5 and 6 will be compared in this case instead of categories 2 and 5 for "List reorder." Two other small changes will be necessary. Since the object is now to print out the inventory information for given items when the period sales category shows activity in those items, it will be necessary to actuate the reading operation when category 6 is greater than category 5. This may be done by reversing terminals T100 and T101 in Fig. 22. Thus whenever the carry counter is on stage 10 after the comparison phase, the step counter will be advanced to stage *s*1, and the reading operation will ensue. The second change necessary will be the elimination of terminal T85 in Fig. 16. In the "List reorder" operation this terminal resulted in advancing the adding ring to the "one" stage prior to entering the 9's complement of the third digit of the reorder level. Such cannot be done in the variation now being described because it would result in always leaving the carry counter on stage "10." Thus, with these simple changes, the device will compare inventory categories 5 and 6, and print out a list containing the desired inventory information relating only to those items in which there has been activity during the period. A "clear activity" operation may be employed to condition the apparatus for the next day or period as desired, either separately or in conjunction with the listing operation as it is performed.

Other variations include the provision of different types of recording media, increasing or decreasing the counters and rings in the control unit and selection system, as well as changing the form and type rings, counter and gates. Therefore it is not intended to confine the invention to the precise form herein shown, but rather to measure it in terms of the appended claims.

Having thus described and disclosed a preferred embodiment of our invention, what we claim as new and desire to secure by Letters Patent of the United States is:

1. A digital information register having in combination means for storing information capable of interpretation in the form of digits related in groups to a multiplicity of separate and unrelated items; means for selecting groups of digits into said storage means and for reading out the stored digits for any given item; means for automatic cross entry of digits relating to a single item where an entry of certain digital information requires an equivalent re-adjustment of other digital information concerning the same item; means for sequentially printing out selected groups of digits relating to a multiplicity of given items; means for storing the multiplicity of digits comprising a continuously rotating drum provided with a magnetizable surface; means for selecting the digits related to given items including an index head, an index track on said drum adapted to generate discrete pulses in said index head as said drum is rotated, a movable reading and writing head adapted to read and write magnetic indicia on the surface of said drum; and means for controlling the operation of said reading and writing head for reading out of and writing into storage actuated by the pulses generated from said index track.

2. A digital information register having in combination; a keyboard including separate banks of keys designating various separate groups of information stored in the form of digits and for selection of various types of transactions employed with said digits; a rotating magnetic storage drum; a movable reading and writing head for said drum; a fixed index head associated with an index track on said drum; an electronic adding ring; input and output means for said adding ring; and a printer adapted to print digits corresponding to the stage of said adding ring which may be fired at a given time; means for positioning said movable head relative to said drum comprising a servo system operated through a potentiometer circuit controlled in part by key settings on said keyboard and in part by a slide wire resistor operatively associated with said movable head; means for selecting a given digit for a given position of said reading and writing head comprising a plurality of selection rings actuated by said index head; said selection rings being adapted to transmit pulses only when certain previously conditioned tubes therein are fired simultaneously; and a reading and writing gate adapted to permit the passage of pulses to or from said reading and writing head to or from said adding ring only when said pulses are transmitted by said selection rings; means for conditioning the tubes of said selection rings including circuits to said keyboard for selection of a basic group of digits; a digit ring and a category ring in addition to said selection rings for selection of lesser groups within said basic group; and a control unit for said reading and writing gate including electronic counters adapted through relays to control the sequence of operation of the said digit and category rings and to open and close said reading and writing gate; said digit and category rings and said counters of said control unit being advanced in response to marker pulses from said index head at the end of each revolution; and said sequence of operation of the counters of said control unit being established by predetermined circuits established by said transaction keys on said keyboard.

3. The register defined in claim 2 further characterized by means operatively associated with said digit ring for transmitting a single pulse after digits are entered into said adding ring for both resetting the adding ring and printing the digit stored in the adding ring, and said printer being adapted to print the said digit on the rising edge of said single pulse before the adding ring is effectually reset by said single pulse.

4. The register defined in claim 2 further characterized by means operatively associated with said reading and writing gate to permit the passage of only signal pulses in phase with the index track pulses.

5. The register defined in claim 2 further characterized by means for presetting said adding ring to correspond to a given digit, means for adding into said adding ring digits stored in said drum, and a carry-over counter actuated by said adding ring when said adding ring carries over from its last stage to its first stage.

6. The register defined in claim 5 further characterized by means operatively associated with said reading and writing gate to permit the passage of only the last half of pulses coming from the drum to the adding ring, and means operatively associated with said carry-over counter when containing a carry-over to transmit a delayed signal to said adding ring to advance said adding ring one stage after said adding ring has been preset to receive the next digit.

7. A reorder level inventory register having in combination; means for storing information capable of interpretation in the form of digits representing the quantity of stock on hand for a multiplicity of different stock items; means for storing digits representing the reorder level for said stock items; means for discriminating between a given stock quantity digit and its corresponding reorder level digit; means for sequentially selecting stock items for such discriminating; and mechanism for sequentially printing out said stored digits relating only to stock items in which the stock quantity digit falls below the reorder level digit.

8. A reorder level inventory register having in combination; means for storing information capable of interpretation in the form of digits representing the quantity of stock on hand for a multiplicity of different stock items; means for storing digits representing the reorder level for each said stock item; and means for discrimination between a given stock quantity digit and its corresponding reorder level digit including a recording medium; means for transmitting a given stock quantity digit and its corresponding reorder level digit in sequence to said discriminating means; means associated with said discriminating means adapted to transmit a signal only when said reorder level digit is greater than said stock quantity digit; means for sequentially selecting stock items for such discriminating; and mechanism for sequentially printing out said stored digits relating only to stock items in which the stock quantity digit falls below the reorder level digit.

9. A reorder level inventory register having in combination, means for storing information capable of interpretation in the form of digits representing the quantity of stock on hand for a multiplicity of unrelated stock items, means for storing digits representing the reorder level for each said stock item, and means for discrimination between a given stock quantity digit and its corresponding reorder level digit including a recording medium adapted for storing impulses representing digits, means for first transmitting to said discriminating means impulses equal to a given stock quantity digit, means for transmitting thereafter to said discriminating means impulses equal to the reorder level digit corresponding to the said stock item, means for transmitting a reorder signal only when the reorder level digital transmission causes said discriminating means to store at least one additional impulse; means for sequentially selecting stock items for such discriminating; and mechanism for sequentially printing out said stored digits relating only to stock items in which the stock quantity digit falls below the reorder level digit.

10. A reorder level inventory register having in combination, means for storing information capable of interpretation in the form of digits representing the quantity of stock on hand for a multiplicity of given stock items, means for storing digits representing the reorder level for each said stock item, and means for discrimination between a given stock quantity digit and its corresponding reorder level digit including an adding ring adapted to store separate impulses the total of which represents a digit, means for transmitting a given item stock quantity digit in the form of impulses to said ring, means for transmitting to said ring in sequence impulses representing the complement of the reorder level digit corresponding to said stock item, carry-over indicating means adapted to transmit a reorder signal only when said ring does not carry over; means for sequentially selecting stock items for such discriminating; and mechanism for sequentially printing out said stored digits relating only to stock items in which the stock quantity digit falls below the reorder level digit.

11. A level discriminating register having in combination, means for storing information capable of interpretation in the form of digits; means for selecting groups of said digits corresponding to stock items; an adding ring; means for reading both digits and complemental digits from said medium and transmitting same to said ring; means for registering carry-over digits from said ring; and a control unit interconnecting the foregoing elements and adapted to operate in the following sequence of steps; a first step in which circuits are established between said recording medium and said adding ring to transmit to said adding ring digital information representing the complement of a first digit stored in the recording medium; and a second step in which circuits are established between said recording medium and said adding ring to transmit to said ring a second digit selected for comparison to said first digit; whereby a digit registered by said carry-over registering means indicates that said first digit is smaller than said second digit; means for sequentially selecting stock items for such discriminating; and mechanism for sequentially printing out said stored digits relating only to stock items in which the stock quantity digit falls below the reorder level digit.

12. A digital information register having in combination means for storing information capable of interpretation in the form of digits including a drum having a magnetizable surface, an adding ring, means for reading digits and the complements of said digits stored on said drum and transmitting same to said adding ring, means for writing digital information on said drum, means for printing digits stored in said ring, means for transmitting digits to said ring independently of said drum, means for storing carry-over digits from said ring, means for resetting said ring to zero, means for rotating said drum continuously, means operatively related to the cycle of said drum for isolating a given area of said drum for reading digital information from or writing the same thereon, a control unit keyed in relation to the cycle of said drum and adapted to energize one or more of the foregoing means in sequence and according to a plurality of definite patterns, and means operatively associated with said control unit for controlling the same in response to signals from said carry-over storage means.

13. A digital information register having in combination a magnetic digital storing drum, means for transmitting digital information to said drum in the form of single electrical impulses each impulse representing one unit and being stored on said drum in cells within defined areas, said drum adapted and mounted for continuous rotation, mechanism associated with said drum for reading digital information thereon and for writing other digital information thereon, means governed in relation to the cycle of said drum adapted to actuate said reading and writing mechanism during the period when said drum rotates in registration with the area on the drum which contains a desired stored digit, the digit so read comprising a series of impulses equal to the number of stored units in said area, means for reading the complement of the stored digit in said area, the complemental digit so read comprising a series of impulses equal to the capacity of the said area less the stored digit; an adding ring adapted to register said digital information additively and in succession in response to said impulses, a printing mechanism adapted to print whatever digit registers on said ring; separate means for adding digits to said ring; means for storing carry-over digits from said ring; means for resetting said ring to zero; a control unit operatively synchronized with the said drum and adapted to energize one or more of the foregoing means in sequence and according to a plurality of definite patterns, and means operatively associated with said control unit for controlling the same in response to signals from said carry-over storage means.

14. A digital information register having in combination a recording medium, a writing mechanism associated with said medium; means continuously moving said medium relative to said writing mechanism, controllable means adapted to energize said writing mechanism at selected intervals whereby to write on selected areas of said medium, said writing mechanism adapted to transmit to said selected areas on said recording medium positive and negative impulses at timed intervals, each positive impulse representing one unit of digital information, said recording medium adapted both to store said digital information and to change the character of stored information in response to the character of impulse transmitted by said writing means, a reading mechanism associated with said medium in the same manner as said writing mechanism adapted to read both stored positive and negative impulses from said medium the sum of the positive impulses representing the stored digit and the sum of the negative impulses representing a complemental digit; an adding ring adapted to register said units additively and in succession in response to said impulses; a printing mechanism connected to said adding ring adapted to print whatever digit registers on said ring; separate means for registering digits on said ring; means for storing carry-over digits from said ring adapted to transmit signals indicating the presence of carry-over impulses; means for resetting said ring to zero; a control unit keyed in relation to the motion of said medium, and adapted to energize one or more of the foregoing means in sequence and in accordance to a plurality of definite patterns; and means operatively associated with said control unit for controlling the same in response to said signals from said carry-over storage means.

15. A digital inventory register comprising, in combination, a continuously rotating storage drum having a magnetic surface for storing information capable of interpretation in the form of digits, a magnetic reading and writing head for magnetizing selected local areas on said surface and for detecting the magnetized condition of said areas, an adding ring comprising a plurality of stages, each stage being capable of assuming one of two conditions, said ring having provision for counting and adding units entered consecutively therein, a printer having provision for printing numbers corresponding to the condition of the stages of the adding ring, a control unit synchronized with the drum including interconnections between the drum, reading and writing head, adding ring and printer, and a keyboard having keys for selecting items of inventory, for selecting numbers to be entered and for setting the control unit, whereby selected numbers may be added to or subtracted from totals stored in the drum, existing totals in the drum may be printed, and existing totals falling below predetermined levels stored on the drum may also be printed.

16. In a register for storing information in the form of digits and in selecting groups representing items of inventory, a reorder level discriminator comprising a keyboard, a printer, a continuously rotating storage drum having a magnetic surface, magnetic heads for magnetizing selected cells on said magnetic surface to a saturated condition in either of two polarities and for detecting the magnetized condition of said cells, a control unit, an adding ring having provision for counting pairs of numbers entered consecutively therein, connections from the keyboard and reading head through the control unit to the adding ring, connections from the adding ring to the printer, a source of pulses synchronized with the drum having connections through the control unit to the writing head and adding ring, means for reversing the polarity of the writing head, and carry-over means connected to the adding ring through the control unit, whereby inventory items stored on the drum may be printed selectively according to the sign of the difference between existing levels and predetermined levels stored on the drum.

17. A digital information register having in combination; a rotating magnetic storage drum, an index head, an index track on said drum associated with said index head having index information recorded thereon in the form of a series of discretely magnetized areas; said index head being further adapted to read from said index track by generating discrete pulses corresponding to each magnetized area on said index track; a movable reading and writing head adapted to be positioned relative to said drum in any one of a multiplicity of positions; means for selecting a given position for said movable head longitudinally of said drum where said movable head will be adjacent to a given circumferential track containing stored digital information; comprising a servo motor for moving said head; a phase sensitive amplifier for operation of said motor; a potentiometer circuit for energizing said amplifier including a reference voltage circuit; a slide wire resistor in said potentiometer circuit; tap lines to said slide wire resistor dividing the same into segments each of which is designed to balance the potential of said reference voltage circuit in said potentiometer circuit; keyboard circuits adapted both to select a given segment of said slide wire and to establish a given reference voltage in said reference voltage circuit; and a hold-off circuit for preventing the operation of said reading and writing means and said hold-off circuit being actuated by said potentiometer circuit whereby said register cannot operate unless said movable head is at rest.

References Cited in the file of this patent

UNITED STATES PATENTS

| | | |
|---|---|---|
| 1,514,954 | Crumpton | Nov. 11, 1924 |
| 2,035,590 | Campos | Mar. 31, 1936 |
| 2,080,100 | Tauschek | May 11, 1937 |
| 2,277,250 | Nyberg | Mar. 24, 1942 |
| 2,416,445 | Jensen | Feb. 25 1947 |
| 2,472,542 | Moerman | June 7, 1949 |
| 2,523,516 | Potter | Sept. 26, 1950 |
| 2,528,394 | Sharpless | Oct. 31, 1950 |
| 2,540,654 | Cohen et al. | Feb. 6, 1951 |
| 2,549,071 | Dusek | Apr. 17, 1951 |
| 2,564,403 | May | Aug. 14, 1951 |
| 2,587,532 | Schmidt | Feb. 26, 1952 |
| 2,588,023 | Magnusson | Mar. 4, 1952 |
| 2,604,262 | Phelps | July 22, 1952 |
| 2,609,143 | Stibitz | Sept. 2, 1952 |
| 2,609,439 | Marshall | Sept. 2, 1952 |
| 2,614,169 | Cohen | Oct. 14, 1952 |
| 2,733,425 | Williams et al. | Jan. 31, 1956 |
| 2,737,342 | Nelson | Mar. 6, 1956 |